US012736893B2

(12) United States Patent
Nagaoka et al.

(10) Patent No.: US 12,736,893 B2
(45) Date of Patent: Sep. 15, 2026

(54) ELECTROPHOTOGRAPHIC CONDUCTIVE ROLLER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Kazuaki Nagaoka, Shizuoka (JP); Atsushi Noguchi, Shizuoka (JP); Yoshitaka Suzumura, Shizuoka (JP); Yuki Nasuno, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/212,824

(22) Filed: May 20, 2025

(65) Prior Publication Data

US 2025/0362627 A1 Nov. 27, 2025

(30) Foreign Application Priority Data

May 22, 2024 (JP) ................................. 2024-083097

(51) Int. Cl.

*G03G 15/08* (2006.01)
*C08G 71/04* (2006.01)
*G03G 15/01* (2006.01)
*G03G 15/02* (2006.01)
*G03G 21/18* (2006.01)

(52) U.S. Cl.

CPC ......... *G03G 15/0808* (2013.01); *C08G 71/04* (2013.01); *G03G 15/0121* (2013.01); *G03G 15/0291* (2013.01); *G03G 15/0818* (2013.01); *G03G 21/1814* (2013.01)

(58) Field of Classification Search

CPC ........... G03G 15/0121; G03G 15/0808; G03G 15/0818; G03G 15/0291; G03G 21/1814; C08G 71/04

See application file for complete search history.

(56) References Cited

U.S. PATENT DOCUMENTS

| | | | |
|---|---|---|---|
| 7,727,134 | B2 | 6/2010 | Nakamura et al. |
| 7,797,833 | B2 | 9/2010 | Nakamura et al. |
| 8,745,870 | B2 | 6/2014 | Kawamura et al. |

(Continued)

FOREIGN PATENT DOCUMENTS

| | | |
|---|---|---|
| JP | 2017-191316 A | 10/2017 |

OTHER PUBLICATIONS

U.S. Appl. No. 19/289,310, filed Aug. 4, 2025, Takashi Hiramatsu.

(Continued)

*Primary Examiner* — Joseph S Wong
(74) *Attorney, Agent, or Firm* — VENABLE LLP

(57) ABSTRACT

An electrophotographic conductive roller including, in this order, a conductive substrate, an ion-conductive elastic layer, and a surface layer, the surface layer includes a resin and carbon black, and the carbon black in the surface layer has an arithmetic mean Rc of circle-equivalent diameters of 60.0 nm or less and a σc/Rc of 0.000 to 0.650, where σc (nm) is a standard deviation of the circle-equivalent diameter. The carbon black in the surface layer has an arithmetic mean d of inter-wall distances of 80.0 to 150.0 nm and a σd/d of 0.000 to 0.600, where σd (nm) is a standard deviation of inter-wall distances.

7 Claims, 3 Drawing Sheets

(56) References Cited

U.S. PATENT DOCUMENTS

| | | | |
|---|---|---|---|
| 9,625,854 B2 | 4/2017 | Koyanagi et al. | |
| 9,846,407 B2 | 12/2017 | Nakamura et al. | |
| 10,571,825 B1 | 2/2020 | Urushihara et al. | |
| 10,678,161 B2 | 6/2020 | Tsuru et al. | |
| 10,705,449 B2 | 7/2020 | Ishida et al. | |
| 10,712,684 B2 | 7/2020 | Wakabayashi et al. | |
| 10,831,126 B2 | 11/2020 | Matsunaga et al. | |
| 10,831,127 B2 | 11/2020 | Utsuno et al. | |
| 10,942,471 B2 | 3/2021 | Ogawa et al. | |
| 11,256,191 B2 | 2/2022 | Takeno et al. | |
| 11,360,405 B2 | 6/2022 | Tomono et al. | |
| 11,360,426 B2 | 6/2022 | Suzumura et al. | |
| 11,465,383 B2 | 10/2022 | Yamaguchi et al. | |
| 11,650,516 B2 | 5/2023 | Uesugi et al. | |
| 12,158,724 B2 | 12/2024 | Nishi et al. | |
| 12,366,816 B2 | 7/2025 | Sasaki et al. | |
| 2017/0293238 A1 | 10/2017 | Kawamura et al. | |
| 2022/0244658 A1* | 8/2022 | Yamada | F16C 13/00 |
| 2022/0244673 A1* | 8/2022 | Takashima | G03G 15/0818 |
| 2024/0301236 A1* | 9/2024 | Noguchi | C09D 175/04 |
| 2025/0244693 A1 | 7/2025 | Nasuno et al. | |
| 2025/0244694 A1 | 7/2025 | Noguchi et al. | |
| 2025/0244712 A1 | 7/2025 | Suzumura et al. | |

OTHER PUBLICATIONS

U.S. Appl. No. 19/298,716, filed Aug. 13, 2025, Yuki Nasuno.
U.S. Appl. No. 19/304,779, filed Aug. 20, 2025, Yoshiaki Shiotari.
U.S. Appl. No. 19/304,800, filed Aug. 20, 2025, Taiji Katsura.
U.S. Appl. No. 19/304,809, filed Aug. 20, 2025, Yoshiaki Shiotari.
U.S. Appl. No. 19/305,005, filed Aug. 20, 2025, Ryo Sugiyama.

* cited by examiner

ELECTROPHOTOGRAPHIC CONDUCTIVE ROLLER, PROCESS CARTRIDGE, AND ELECTROPHOTOGRAPHIC IMAGE FORMING APPARATUS

BACKGROUND OF THE INVENTION

Field of the Invention

The present disclosure relates to an electrophotographic conductive roller, a process cartridge, and an electrophotographic image forming apparatus.

Description of the Related Art

As the processing speed of the electrophotographic image forming apparatuses becomes faster, new characteristics that have not been previously required are being demanded for various electrophotographic conductive rollers, such as developing rollers and charging rollers.

As an example, an adverse effect when a voltage is applied to a developing blade that is in contact with a developing roller and the toner is made to carry charges more quickly utilizing the potential is mentioned. Here, when a high voltage is applied by the developing blade to charge the toner more quickly in accordance with the increase in the process speed, charge leakage from the toner to the developing roller is mentioned.

Also, in a charging roller in a recent cleaner-less system or the like, measures are taken against drum contamination by providing a peripheral speed difference between the photosensitive drum and the charging roller. However, in this measure, the amount of charge injected from the charging roller to the photosensitive drum increases, and the conventional surface layer is liable to cause charging non-uniformity.

Conventionally, various techniques have been developed for charge leakage, and for example, Japanese Patent Application laid-open No. 2017-191316 discloses a technique for increasing the resistance of a developing roller by introducing a specific structure having a polycarbonate structure into a surface layer. Japanese Patent Application laid-open 2017-191316 indicates that, as a result, charge leakage from the toner to the developing roller can be suppressed.

SUMMARY OF THE INVENTION

Accordingly, the present inventors have studied to apply the surface layer technique of Japanese Patent Application laid-open No. 2017-191316 to an electrophotographic image forming apparatus equipped with a developing blade capable of applying a high voltage by forming a developing roller using an ion-conductive elastic layer.

However, the inventors have recognized that, even when the surface layer technique of Japanese Patent Application laid-open No. 2017-191316 is used, an electrophotographic image forming apparatus equipped with a developing blade capable of applying a high voltage causes charge leakage from the toner, to which charges are injected by the developing blade, to the developing roller. This charge leakage caused a decrease in the electric charge amount, resulting in an electric charge amount equal to or less than the design value, and, as a result, caused image density degradation and image quality degradation called "fogging", in which the toner was transferred to a solid white portion on a paper sheet.

As described above, when a high voltage is applied by a developing blade in order to cope with an increase in the processing speed of an electrophotographic image forming apparatus, significant image quality deterioration as above is observed.

Also, in a charging roller, a technique for suppressing charge injection is required to charge a drum uniformly. It has been found that this technique can be realized by the same method as that for suppressing charge leakage occurring in the developing roller.

The present disclosure is directed to providing an electrophotographic conductive roller that can surely reduce the charge leakage of a toner to an electrophotographic conductive roller in an electrophotographic image forming apparatus that applies a high voltage to a developing blade even when an electrophotographic conductive roller with an ion-conductive elastic layer is used. The present disclosure is also directed to providing a process cartridge and an electrophotographic image forming apparatus equipped with the electrophotographic conductive roller.

According to at least one aspect of the present disclosure, provided is an electrophotographic conductive roller comprising, in this order, a conductive substrate, an ion-conductive elastic layer, and a surface layer, the surface layer comprising a resin and carbon black;

the carbon black in the surface layer having an arithmetic mean Rc of circle-equivalent diameters of 60.0 nm or less and a $\sigma c/Rc$ of 0.000 to 0.650, where $\sigma c$ (nm) is a standard deviation of the circle-equivalent diameters; and the carbon black in the surface layer having an arithmetic mean d of inter-wall distances of 80.0 to 150.0 nm and a $\sigma d/d$ of 0.000 to 0.600, where $\sigma d$ (nm) is a standard deviation of the inter-wall distances.

Also, according to at least one aspect of the present disclosure, provided is a process cartridge configured to be attachable to and detachable from the main body of an electrophotographic image forming apparatus, the process cartridge being provided with the electrophotographic conductive roller of the present disclosure.

Further, according to at least one aspect of the present disclosure, provided is an electrophotographic image forming apparatus including a photoreceptor and a developing roller that supplies a developer to an electrostatic latent image formed on the photoreceptor, wherein the developing roller is the electrophotographic conductive roller of the present disclosure.

According to at least one aspect of the present disclosure, an electrophotographic conductive roller that can surely reduce the charge leakage of a toner to an electrophotographic conductive roller in an electrophotographic image forming apparatus that applies a high voltage to a developing blade even when an electrophotographic conductive roller with an ion-conductive elastic layer is used.

According to at least one aspect of the present disclosure, a process cartridge and an electrophotographic image forming apparatus equipped with the electrophotographic conductive roller can be provided.

Further features of the present invention will become apparent from the following description of exemplary embodiments with reference to the attached drawings.

DESCRIPTION OF THE EMBODIMENTS

Figure 1:
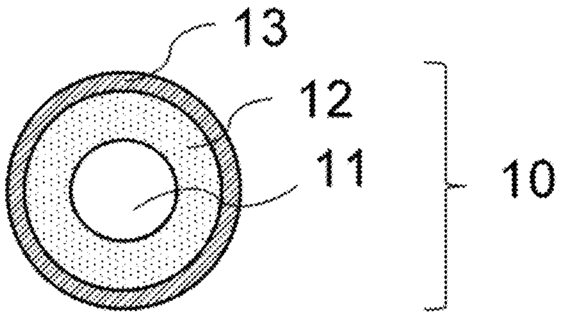
FIG. 1 is a schematic sectional view illustrating an example of the electrophotographic conductive roller according to the present disclosure.

In the present disclosure, "from XX to YY" or "XX to YY" indicating a numerical range means a numerical range including a lower limit and an upper limit that are end points unless otherwise specified. In a case where numerical ranges are described in stages, an upper limit and a lower limit of each numerical range can be combined as desired. Furthermore, in the present disclosure, for example, description such as "at least one selected from the group consisting of XX, YY, and ZZ" means any of XX, YY, ZZ, a combination of XX and YY, a combination of XX and ZZ, a combination of YY and ZZ, or a combination of XX, YY, and ZZ. When XX is a group, a plurality of constituents may be selected from XX, and the same applies to YY and ZZ.

The inventors have inferred the reason why the charge leakage from the toner cannot be sufficiently prevented in a combination with a developing blade to which a high voltage is applied when the technique of the surface layer according to Japanese Patent Application laid-open No. 2017-191316 is used on an ion-conductive elastic layer as follows.

The developing roller according to Japanese Patent Application laid-open No. 2017-191316 includes silicone rubber in which carbon black is dispersed in an elastic layer as an elastic layer and has a configuration using a so-called electron-conductive elastic layer. In this case, a conductive path due to carbon black occupies a large proportion of a portion of the elastic layer that contributes to conductivity. It is also considered that the surface of such an elastic layer contains conductive carbon black and an insulating rubber. Therefore, it is believed that the charge flowing from the surface layer will not leak through the entire regions of the surface of the elastic layer, but will leak starting from the carbon black on the surface of the elastic layer.

Conversely, if an ion-conductive rubber is used for the elastic layer, the entire surface of the elastic layer becomes conductive. Therefore, the present inventors have inferred that the threshold for leakage was lowered, and only the surface layer technique in Japanese Patent Application laid-open No. 2017-191316 is insufficient.

On the basis of the above estimation, the inventors have recognized that it is necessary to further devise the surface layer when an ion-conductive elastic layer is used, and have progressed intensive studies.

As a result of the studies, the present inventors have found that controlling the dispersion state of carbon black in the surface layer is important to suppress charge leakage. As described above, carbon black greatly contributes to conductivity in the mixture of a resin and carbon black. In other words, the contribution of the present state of carbon black is significant. That is, the present inventors have found that, in controlling conductivity, the effect of suppressing charge leakage can be largely obtained by controlling the dispersion state of carbon black in the surface layer.

Specifically, the electrophotographic conductive roller of the present disclosure includes, in this order, a conductive substrate, an ion-conductive elastic layer, and a surface layer. The surface layer contains a resin and carbon black. The carbon black in the surface layer has an arithmetic mean Rc of circle-equivalent diameters in the surface layer of 60.0 nm or less and a σc/Rc of 0.000 to 0.650, where σc (nm) is a standard deviation of the circle-equivalent diameter. The carbon black in the surface layer has an arithmetic mean d of inter-wall distances of 80.0 to 150.0 nm and a σd/d of 0.000 to 0.600, where σd (nm) is a standard deviation of inter-wall distances. The present inventors have found that even when the elastic layer is made to be ion-conductive, an electrophotographic conductive roller capable of suppressing charge leakage can be provided in these cases.

Hereinafter, the present disclosure will be described in more detail.

Electrophotographic Conductive Roller

An electrophotographic conductive roller (hereinafter simply referred to as a conductive roller) according to the present aspect has a conductive substrate, an ion conductive elastic layer, and a surface layer in this order.

An example of the conductive roller is illustrated in FIG. 1. The electrophotographic conductive roller 10 illustrated in FIG. 1 has a cylindrical or hollow cylindrical substrate 11, an elastic layer 12, and a surface layer 13 in this order. Specifically, the elastic layer 12 is laminated on the outer surface, which is the outer peripheral surface of the substrate 11. The surface layer 13 is laminated on the outer surface, which is an outer peripheral surface of the elastic layer 12.

Substrate

The substrate 11 is electrically conductive and functions as a support member for an electrophotographic conductive roller and, in some cases, an electrode. A specific example of the substrate is preferably a solid cylindrical or hollow cylindrical shape.

Materials constituting the substrate may be selected, as appropriate, from those known in the field of electrophotographic conductive rollers and materials available as such an electrophotographic conductive roller. As an example, a metal represented by aluminum and stainless steel, a carbon steel alloy, a conductive synthetic resin, metals or alloys such as iron or copper alloys.

Furthermore, the material constituting the substrate may be subjected to oxidation treatment or plating treatment with chromium, nickel, or the like. As the type of plating, either electroplating or electroless plating may be used. From the viewpoint of dimensional stability, electroless plating is preferable. Examples of the type of electroless plating used here may include nickel plating, copper plating, gold plating, and other various kinds of alloy plating. The plating thickness is preferably 0.05 μm or more, and the plating thickness is preferably 0.1 to 30 μm in consideration of the balance between working efficiency and antirust ability.

A primer may be applied to the surface of the substrate in order to improve the adhesion between the substrate and the elastic layer. As the primer, known primers can be selected and used in accordance with the rubber material for forming the elastic layer, the material of the support, and the like. Examples of materials for the primer may include a thermosetting resin or a thermoplastic resin, and specific examples may include materials such as a phenolic resin, polyurethane, an acrylic resin, a polyester resin, a polyether resin, and an epoxy resin.

Elastic Layer

The elastic layer 12 is ion-conductive. Other additives may also be included in order to develop properties such as conductivity and strength required as an electrophotographic conductive roller.

As a material used for the elastic layer, a cross-linked product of a crosslinkable and ion-conductive rubber composition is preferable. Specifically, methods such as mixing an epichlorohydrin rubber, in which the rubber itself exhibits ionic conductivity, with an acrylonitrile-butadiene rubber (NBR) and an ethylene-propylene-diene rubber (EPDM) may be mentioned. That is, the elastic layer preferably contains epichlorohydrin rubber. It is more preferable that the elastic layer further includes NBR.

Also, as a method of providing further conductivity to the elastic layer, it is preferable that the elastic layer contains a conductivity-providing agent such as an electron-conductive material or an ion-conductive material.

Examples of electron-conductive materials may include the following materials:

Conductive carbon, for example, carbon black, such as Ketjen black EC and acetylene black; carbon for rubbers, such as super abrasion furnace (SAF), intermediate SAF (ISAF), high abrasion furnace (HAF), fast extruding furnace (FEF), generic purpose furnace (GPF), semi-reinforcing furnace (SRF), fine thermal (FT), and medium thermal (MT); carbon for color (inks) subjected to oxidation treatment; and metals such as copper, silver, and germanium and metal oxides thereof. Among these, conductive carbon, which is easy to control conductivity even with a small amount, is preferable.

Examples of ion-conductive materials may include the following materials.

Inorganic ion-conductive materials such as sodium perchlorate, lithium perchlorate, calcium perchlorate, and lithium chloride; and organic ion-conductive materials such as modified aliphatic dimethyl ammonium ethosulfate and stearyl ammonium acetate.

The elastic layer may further optionally contain various additives such as particles, a plasticizer, a filler, a bulking agent, a crosslinking agent, a crosslinking promoter, a vulcanization aid, a crosslinking aid, an acid acceptor, a curing inhibitor, an antioxidant, and an anti-aging agent. These optional components can be formulated in amounts that do not impair the characteristics required for the electrophotographic conductive roller.

Examples of sulfur-based crosslinking agents may include sulfur such as powdered sulfur, oil-treated powdered sulfur, precipitated sulfur, colloidal sulfur, and dispersible sulfur; organic sulfur-containing compounds such as tetramethylthiuram disulfide, tetrabenzylthiuram disulfide, and N,N-dithiobismorpholine; and the like.

Examples of crosslinking promoters for promoting crosslinking may include a thiuram-based promoter, a thiazole-based promoter, a thiourea-based promoter, a guanidine-based promoter, a sulfenamide-based promoter, a dithiocarbamate-based promoter, and the like.

Examples of crosslinking aids may include conventionally known crosslinking aids, including metal compounds such as zinc oxide; and stearic acid, oleic acid, and fatty acids.

The acid acceptor is used to prevent chlorine-based gas generated from an epichlorohydrin rubber or the like during crosslinking from remaining in the interior of an electrophotographic member of a finished product or prevent crosslinking inhibition and contamination of other members caused thereby from occurring.

Various substances acting as acid receptors can be used as the acid acceptor, but among them, hydrotalcites, which have excellent dispersibility, and the like are preferably used.

Examples of fillers that may be used may include zinc oxide, silica, carbon black, talc, calcium carbonate, magnesium carbonate, aluminum hydroxide, and the like. Among them, at least one selected from the group consisting of calcium carbonate and zinc oxide is preferable.

By compounding these fillers, improvement in the mechanical strength of resins can be expected.

It is also possible to formulate a blowing agent in an elastic layer and foam the elastic layer during molding in order to impart flexibility.

Surface Layer

Resin

The surface layer contains a resin. The resin acts as a binder resin. As the binder resin for the surface layer 13, a resin generally used as an electrophotographic conductive roller may be used, but it is preferable to include polyurethane from the viewpoint of improving wear resistance, which is a characteristic required for rollers.

Furthermore, from the viewpoint of easily suppressing charge leakage from the toner to the electrophotographic conductive roller, the resin contained in the surface layer preferably contains a polyurethane having a polycarbonate structure. Furthermore, in order to make it easy to sufficiently maintain a light load on the toner and wear resistance of the surface layer while suppressing charge leakage from the toner to the electrophotographic conductive roller, it is more preferable to use the polyurethane having the structure described below as a resin contained in the surface layer.

The polyurethane preferably satisfies at least one selected from the group consisting of the following (A), (B), and (C).

Among them, it is more preferable that the polyurethane satisfies at least two selected from the group consisting of the following (A), (B), and (C) from the viewpoint of maintaining higher volume resistance of the surface layer, maintaining flexibility, and suppressing wear, the viewpoint of further suppressing fogging, and the viewpoint of better image density stability.

(A) Having a structure represented by formula (1) below in a molecule;

(B) having one or both structures of a structure represented by formula (2) below and the structure represented by formula (3) below in a molecule; and (C) having a structure represented by formula (4) below in a molecule:

In other words, the polyurethane preferably meets at least any one of the following:

having at least the structure represented by formula (1) and the structure represented by formula (2)

having at least the structure represented by formula (1) and the structure represented by formula (3)

having at least the structure represented by formula (1) and the structure represented by formula (4)

having at least the structure represented by formula (2) and the structure represented by formula (4)

having at least the structure represented by formula (3) and the structure represented by formula (4)

(1)

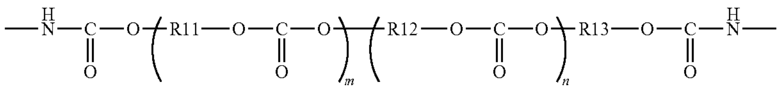

(2)

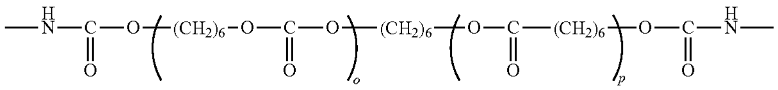

(3)

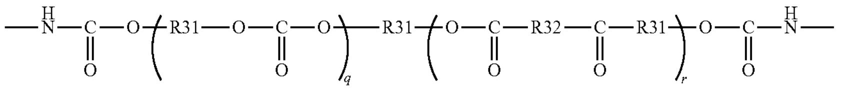

(4)

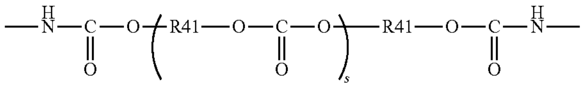

In formula (1), R11, R12, and R13 each independently represent a divalent C3-9 (preferably C4-6) hydrocarbon group; R11 and R12 are hydrocarbon groups different from each other; R13 is the same hydrocarbon group as R11 or R12; m and n are the average numbers of moles added, each independently representing the number of 1.0 or greater (preferably 1.0 to 20.0, more preferably 2.0 to 12.0, still more preferably 4.0 to 10.0, and particularly preferably 5.0 to 9.0).

In formula (2), o and p are the average number of moles added, each independently representing the number of 1.0 or greater (preferably 1.0 to 15.0, more preferably 2.0 to 10.0, and still more preferably 4.0 to 10.0).

In formula (3), R31 and R32 each independently represent a divalent C3-8 hydrocarbon group; q and r are the average number of moles added, each independently representing the number of 1.0 or greater (preferably 1.0 to 20.0 and more preferably 2.0 to 14.0).

In formula (4), R41 represents a divalent C6-9 (preferably C5-8) hydrocarbon group, and s is the average number of moles added, representing the number of 1.0 or greater (preferably 1.0 to 22.0, more preferably 5.0 to 20.0, and still more preferably 4.0 to 18.0).

The structure represented by formula (1) is a structure obtained by reacting isocyanate with a copolymerized polycarbonate polyol having two different hydrocarbon groups to suppress crystallinity. Because crystallinity is suppressed, aggregation energy in the soft segment is small, and flexibility and high volume resistance can be imparted to the surface layer. This makes it possible to suppress charge leakage occurring in the resin portion of the surface layer at a higher level. Furthermore, it is also easier to ensure flexibility to control toner degradation at the same time.

Furthermore, by using the structure represented by formula (1) in the surface layer in combination with the structure represented by formula (2), the structure represented by formula (3), and the structure represented by formula (4), the adhesion of the surface layer can be reduced. In other words, it is preferable that the polyurethane has, in the molecule, a structure represented by formula (1) and at least one structure selected from the group consisting of a structure represented by formula (2), a structure represented by formula (3), and a structure represented by formula (4). By reducing the adhesion of the surface layer, the adhesion of powder such as a toner and paper powder to the surface layer can be suppressed. As a result, changes in surface characteristics due to contamination can be suppressed, and the originally intended performance associated with the roller can be maintained for a long time.

In formula (1), when the number of carbon atoms in R11 and R12 is 3 or more, the number of carbonate groups that are polar functional groups and have strong aggregation energy is not too large in the polyurethane having a polycarbonate structure, and it is thus easier to keep the surface layer flexible and electrically high resistance. When the number of carbon atoms in R11 and R12 is 9 or less, the amount of carbonate groups in the polyurethane is not too small, and it is easier to keep the strength of the polymer.

The hydrocarbon groups represented by R11, R12, and R13 may have a branched structure or a cyclic structure.

The structure represented by formula (2) and the structure represented by formula (3) are structures obtained by reacting an isocyanate with a copolymerized polyol obtained by copolymerizing a polycarbonate structure and a polyester structure. The crystallinity of the polymer can be suppressed by copolymerizing a polycarbonate structure and a polyester structure. By introducing an ester group having a stronger aggregation energy than a carbonate group, the soft segment is properly reinforced, and it is thus easier to impart wear resistance to the surface layer.

When a surface layer is formed by using polyurethane having either one or both of the structure represented by formula (2) and the structure represented by formula (3), in addition to the structure represented by formula (1) or the structure represented by formula (4), sufficient volume resistance can be imparted to the surface layer while having a polar ester group, and charge leakage can be further suppressed. In other words, it is preferable that the polyurethane has, in the molecule, either one or both of the structure represented by formula (2) and the structure represented by formula (3), and either one or both of the structure represented by formula (1) and the structure represented by formula (4).

In formula (3), when the number of carbon atoms in R31 and R32 is 3 or more, the number of carbonate groups and ester groups that are polar functional groups and have strong aggregation energy are not too large in the polyurethane, and it is thus easier to keep the surface layer flexible. When the number of carbon atoms in R31 and R32 is 8 or less, the amount of carbonate groups and ester groups in the polyurethane is not too small, and it is thus easier to impart wear resistance to the surface layer.

The structure represented by formula (4) is a structure obtained by reacting an isocyanate with a highly crystalline polycarbonate polyol having one type of hydrocarbon group. Because this structure is highly crystalline and easy to align in soft segments, it is easier to impart wear resistance and high volume resistance to the surface layer. By using the structure represented by formula (4) in the surface layer in combination with the structure represented by formula (1), the structure represented by formula (2), and the structure represented by formula (3), it is easier to keep the flexibility of the surface layer and to suppress damages on the toner or the like. In other words, it is preferable that the polyurethane has, in the molecule, a structure represented by formula (4) and at least one structure selected from the group consisting of a structure represented by formula (1), a structure represented by formula (2), and a structure represented by formula (3).

In formula (4), when the number of carbon atoms in R41 is 6 or more, crystallinity is easily developed, and wear resistance and high volume resistance are easily imparted to the surface layer. When the number of carbon atoms in R41 is 9 or less, excessive crystallinity is suppressed. At this time, when the polyurethane has, in the molecule, at least one structure selected from the group consisting of the structure represented by formula (1), the structure represented by formula (2), and the structure represented by formula (3), it is easier to suppress the increase in hardness of the surface layer.

The structure of the resin contained in the surface layer of the electrophotographic conductive roller can be monitored by, for example, thermal decomposition GC/MS, FT-IR, or NMR analysis.

Polyurethane having a polycarbonate structure can be produced using a polyol compound and a polyisocyanate compound. The synthesis of the polyurethane can employ the following methods (I) and (II):

(I) a one-shot process for mixing and reacting a polyol compound and a polyisocyanate compound, and (II) a process for reacting a part of polyol compounds with an isocyanate compound to yield an isocyanato group-terminated pre-polymer and then reacting the isocyanato group-terminated pre-polymer with a chain extender such as a low molecular diol or a low molecular triol.

In the present disclosure, the polyurethane may be synthesized by any of the methods described above, but a more preferable method includes reacting a polyol compound with an isocyanate compound in a state where the isocyanate is excess with respect to hydroxyl groups to obtain an isocyanato group-terminated prepolymer; separately, reacting a polyol compound with an isocyanate compound in a state where hydroxyl groups are excess with respect to isocyanate to obtain a hydroxyl group-terminated prepolymer, and then subjecting the isocyanato group-terminated prepolymer with the hydroxyl group-terminated prepolymer as a chain extender to heat curing reaction.

The polyurethane having a polycarbonate structure is preferably a reaction product of a mixture containing a hydroxyl group-terminated prepolymer and an isocyanato group-terminated prepolymer. The mixture can be used as a surface layer-forming coating liquid. The polyurethane having a polycarbonate structure is more preferably a reaction product of a mixture containing a hydroxyl group-terminated prepolymer, an isocyanato group-terminated prepolymer, and an additive.

When there are many hydroxyl groups, isocyanato groups, urea bonds, allophanate bonds, isocyanurate bonds, and the like, many polar functional groups are present in the polyurethane. Therefore, the water absorbency of the polymer increases, and the volume resistance of the surface layer becomes low, which may lead to charge leakage in the electrophotographic conductive roller. Meanwhile, by heat-curing the hydroxyl group-terminated prepolymer and the isocyanato group-terminated prepolymer, a polyurethane with less unreacted polyol and polar functional groups can be obtained without using any excess isocyanate.

Polyol Compound

The polyol compound is selected from known polycarbonate polyols and polyester polycarbonate co-polymerized polyols.

Examples of polycarbonate polyols may include the following: polynonamethylene carbonate diol, poly(2-methyl-octamethylene) carbonate diol, polyhexamethylene carbonate diol, polypentamethylene carbonate diol, poly(3-methylpentamethylene) carbonate diol, polytetramethylene carbonate diol, polytrimethylene carbonate diol, poly(1,4-cyclohexanedimethylene carbonate) diol, poly(2-ethyl-2-butyl-trimethylene) carbonate diol, and random or block copolymers thereof.

Examples of polyester polycarbonate copolymer polyols may include the following. A copolymer obtained by polycondensing the polycarbonate polyol with a lactone such as F-caprolactone and a copolymer obtained by polycondensing a diol such as 1,3-propanediol, 1,4-butanediol, 1,5-pentanediol, 1,6-hexanediol, 3-methylpentanediol, or neopentyl glycol, a dicarboxylic acid such as adipic acid or sebacic acid, and an alkylene carbonate such as ethylene carbonate.

Polyisocyanate Compound

The polyisocyanate compound is selected from commonly used known ones, and examples thereof may include the followings: tolylene diisocyanate (TDI), diphenylmethane diisocyanate (MDI), polymeric diphenylmethane polyisocyanate, hydrogenated MDI, xylylene diisocyanate (XDI), hexamethylene diisocyanate (HDI), isophorone diisocyanate (IPDI), polymethylene polyphenyl polyisocyanate (polymeric MDI), derivatives thereof, and isocyanurates thereof, and the like. Among these, aromatic isocyanates such as tolylene diisocyanate (TDI), diphenylmethane diisocyanate (MDI), polymeric diphenylmethane polyisocyanate, and polymeric MDI are more suitably used.

Among the foregoing, polymeric MDI is preferable. Here, polymeric MDI is a mixture of monomeric MDI and a high molecular weight polyisocyanate, and is represented by the following formula (A). In formula (A), n is preferably from 0 to 4.

Commercially available polymeric MDI may also be used, and examples thereof may include Millionate MR series (manufactured by Tosoh Corporation), such as Millionate MR400 (trade name).

(A)

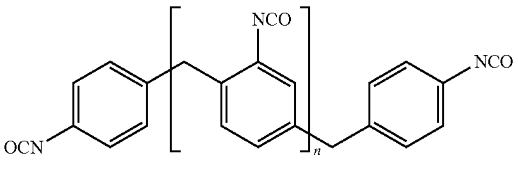

Other polyisocyanates may be used, as appropriate, as long as they do not affect the surface potential of the electrophotographic conductive roller.

The ratio of the number of isocyanato groups to the number of hydroxyl groups (hereinafter also referred to below as "NCO/OH ratio") is preferably 1.0 to 2.0. If the ratio of NCO/OH is 1.0 to 2.0, the crosslinking reaction proceeds, and the oozing, a so-called "bleeding" of unreacted components and low molecular weight polyurethane is liable to be suppressed. This NCO/OH ratio is more preferably 1.0 to 1.6. If the ratio of NCO/OH is 1.0 to 1.6, bleeding is suppressed, and the hardness of the polymer is easily suppressed.

The content of the polyurethane in the surface layer is not particularly limited, but preferably 50% to 95% by weight, more preferably 60% to 80% by weight, and even more preferably 65% to 75% by weight.

Carbon Black

The surface layer contains carbon black. By containing carbon black, the surface layer can provide conductivity. Carbon black is not particularly limited but preferably has a surface functional group capable of interacting with a functional group present in the additives described below. Examples of carbon blacks exhibiting these properties may include carbon blacks such as furnace black, thermal black, acetylene black, Ketjen black, and the like.

As described above, charge leakage can be suppressed by controlling the dispersion of carbon black in the surface layer with respect to the ionic conductive elastic layer. Specifically, the arithmetic mean Rc of the circle-equivalent diameter of the carbon black in the surface layer is 60.0 nm or less. When the standard deviation of the circle-equivalent diameter is taken as σc [nm], σc/Rc is 0.000 to 0.650. Rc denotes the dispersed particle size of carbon black.

Regarding the distance between carbon blacks, when the arithmetic mean d of the inter-wall distances of carbon blacks in the surface layer is 80.0 to 150.0 nm, and σd/d is 0.000 to 0.600 when the standard deviation of the inter-wall distances is taken as σd [nm].

The reason why the charge leakage can also be suppressed in an ion-conductive elastic layer if the dispersion state of carbon black in the surface layer is within the numerical ranges of the circle-equivalent diameter and the inter-wall distances described above is inferred as follows.

If the dispersed particle size of carbon black is large, the inter-wall distances are liable to vary when viewed across the entire surface layer. Therefore, a portion where the inter-wall distance is short exists locally, and a conductive path of carbon black is formed. As described above, it is believed that the entire surface of the ion-conductive elastic layer contributes to charge leakage. Therefore, the formation of conductive paths inside the surface layer is substantially equal to the formation of conductive paths that directly connect the surface layer surface and the elastic layer surface. Accordingly, it is believed that if the dispersed particle size of carbon black is large, charge leakage is likely to occur.

In contrast, when the dispersed particle size is small, the inter-wall distances become uniform when viewed from the entire surface layer, and the variation is less likely to occur. As a result, a portion where the inter-wall distance is locally short is reduced, and conductive paths of carbon black are less likely to be formed, and resistance increases. Furthermore, the capacitance is also small, resulting in a higher impedance. In other words, carbon black is highly resistive, increasing the influence of the capacitance component and acting as a pseudo-capacitor component. As a result, charge leakage is suppressed.

It should be noted that plural types of carbon black may be used in combination as long as the dispersion state can be maintained.

The arithmetic mean Rc of the circle-equivalent diameter of the carbon black in the surface layer is preferably 55.0 nm or less. The lower limit is not particularly limited but preferably 40.0 to 60.0 nm and more preferably 45.0 to 55.0 nm.

σc/Rc is preferably 0.600 or less. The lower limit is not particularly limited but preferably 0.500 to 0.650, more preferably 0.550 to 0.650, and further preferably 0.550 to 0.600.

The standard deviation of the circle-equivalent diameter σc is not particularly limited but may be 0.0 to 40.0 nm, preferably 25.0 to 40.0 nm, and more preferably 25.0 to 35.0 nm. Rc and σc are measured using SEM. Specific measurement methods will be described later.

The arithmetic mean Rc and standard deviation σc of the circle-equivalent diameter can be changed depending on the dispersion state in a mill or the like when preparing the surface layer-forming coating liquid, for example. Specifically, if dispersion is weakened, Rc and σc become larger, and if dispersion is strengthened, Rc and σc become smaller. Usually, Rc will converge if it is sufficiently dispersed. Thus, beyond a certain dispersion state, σc can be decreased while leaving Re nearly constant. As a result, σc/Rc can be reduced. In addition, by using carbon black having a small primary particle size and a small DBP absorption amount, σc and Rc can be reduced. Furthermore, by using the additives described below, σc and Rc can be reduced. In contrast, by using carbon black having a large primary particle size and a large DBP absorption amount, σc and Rc can be increased.

The arithmetic mean d of the inter-wall distances of carbon black in the surface layer is preferably 90.0 to 120.0 nm and more preferably 92.0 to 115.0 nm.

σd/d is more preferably 0.500 to 0.600 and still more preferably 0.550 to 0.600.

The standard deviation σd of the inter-wall distances is not particularly limited but may be 0.0 to 95.0 nm, preferably 50.0 to 95.0 nm, and more preferably 60.0 to 85.0 nm. d and σd are measured using SEM. Specific measurement methods will be described later.

The arithmetic mean d and standard deviation σd of the inter-wall distances can be changed depending on the dispersion state with a mill or the like when preparing the coating liquid for forming the resin layer, for example. Specifically, d becomes smaller and σd becomes larger when the dispersion is weakened, and d becomes large and σd becomes small when the dispersion is strengthened. Therefore, σd/d tends to be large when dispersion is weak, and σd/d tends to be small when dispersion is strong. In addition, by using carbon black having a small primary particle size and a small DBP absorption amount, d can be reduced. Furthermore, by using the additives described below, d can be reduced. In contrast, by using carbon black having a large primary particle size and a large DBP absorption amount, d can be increased.

The number average diameter of the primary particles of carbon black is not particularly limited, but the number average diameter of the primary particles of carbon black is preferably 30 nm or less because it is easier to obtain the desired dispersion state and the surface potential required for the completed electrophotographic conductive roller.

When the number average diameter of the primary particles of carbon black is 30 nm or less, aggregates (primary aggregates), the smallest dispersible unit of carbon black, become smaller. Furthermore, the structure (size of connection of primary particles) also becomes smaller. As a result, conductive paths are less likely to be formed. Therefore, an assumed dispersed state is likely to be formed. The lower the number average diameter, the more preferable. The lower limit is not particularly limited, but 5 to 30 nm is preferable.

The number average diameter of primary particles of carbon black is calculated by transmission electron microscope (TEM).

The DBP absorption amount of the carbon black is not particularly limited but is preferably 90 mL/100 g or less. When the DBP absorption amount of the carbon black is 90 mL/100 g or less, the carbon black structure becomes small, and conductive paths are less likely to be formed, so that a sufficiently high impedance can be easily obtained. For example, the DBP absorption amount of carbon black is preferably 30 to 90 mL/100 g, more preferably 30 to 70 mL/100 g.

The pH of the carbon black is not particularly limited but is preferably 4.0 or less. When the pH of the carbon black is 4.0 or less, the effect of dispersion stability is obtained when the carbon black is dispersed in the resin by repulsion of the surface functional group of the carbon black, and aggregation of the carbon black is less likely to occur. Therefore, sufficiently high impedance can be easily obtained. The lower the pH of the carbon black, the more preferable, and the lower limit is not particularly limited. For example, the pH of the carbon black is preferably 2.0 to 4.0.

Even if the number average diameter, DBP absorption amount, and pH of the primary particles of carbon black are controlled to be within the above ranges, particularly when a polyurethane having a polycarbonate structure (hereinafter also referred to as polycarbonate urethane) is used as a binder resin, carbon black cannot be dispersed sufficiently, and the desired dispersion state may not be obtained in some cases. The reasons for this are not clearly known but are inferred as follows.

The hydroxyl group, which is the surface functional group of carbon black, tends to interact with the hydroxyl group at the end of the polycarbonate diol. Meanwhile, the structure in which the carbonate bond and the hydrocarbon group are bonded, which is present between the two hydroxyl groups of the polycarbonate diol, is hydrophobic due to the presence of the hydrocarbon group, and is difficult to interact with the carbon black. Since the structure is more stable when hydrophobic sites are present near each other or when hydrophilic sites are present near each other, the same hydrophilic carbon black is present near hydrophilic carbon black. As a result, carbon blacks tend to aggregate with each other, which is considered to be a factor that can prevent dispersion.

In such a case, additives described below may be used to obtain the desired dispersion state of carbon black.

The content of carbon black is not particularly limited, but it is desirable to add carbon black so as to achieve the desired volume resistance and the desired surface potential. For example, the content of carbon black is preferably 30 parts by mass or less relative to 100 parts by mass of the resin forming the surface layer. The content is more preferably 10 to 30 parts by mass, and further preferably 15 to 25 parts by mass.

When the content of carbon black is 30 parts by mass or less, the distance between carbon blacks in the coating liquid is properly maintained. As a result, the probability of collision of carbon black due to Brownian motion or the like decreases, and the carbon black is less likely to aggregate. As a result, carbon black is easily dispersed, and dispersion stability is also improved. As a result, it is easier to make the dispersion state of the carbon black a desired state in the surface layer formed from the coating liquid.

Additives

It is also one of the preferable aspects to use additives to further improve the dispersibility of carbon black in the resin. In other words, it is preferable that the surface layer contains an additive. Here, for example, at least one compound selected from the group consisting of a compound represented by formula (5) below, a compound represented by formula (6) below, and a compound represented by formula (7) below can be suitably used as the additives. In other words, it is preferable that the surface layer further contains at least one compound selected from the group consisting of a compound represented by formula (5) below, a compound represented by formula (6) below, and a compound represented by formula (7) below.

As one of the methods for incorporating the additive in the surface layer, a method of incorporating the additive in a surface layer-forming coating liquid may be mentioned.

The compound represented by formula (5) below has a hydroxyl group at the terminal, and the compound represented by formula (6) below has an amino group at the terminal. Accordingly, in a surface layer formed using a surface layer-forming coating liquid containing at least one compound selected from the group consisting of a compound represented by formula (5) below and a compound represented by formula (6) below, the compound can be incorporated into the end of the polymer chain of polyurethane. Even in such a case, the effect of improving the dispersibility of carbon black can be expected. It is believed that this was because the side chain methyl groups of propylene oxide interact with carbon black. In other words, the polyurethane may be a reaction product of a polyol compound, a polyisocyanate compound, and at least one compound selected from the group consisting of a compound represented by formula (5) below and a compound represented by formula (6) below. The additive is preferably present in the surface layer independently of the polyurethane.

A compound represented by formula (5) below is preferable among the compounds represented by formula (5) below, the compounds represented by formula (6) below, and the compounds represented by formula (7) below because the dispersibility of carbon black and the affinity of polycarbonate urethane are particularly excellent.

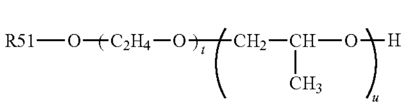

(5)

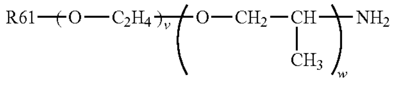

(6)

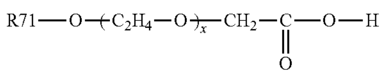

(7)

In formula (5), R51 represents a monovalent C1-12 (preferably C3-12, more preferably C3-8, and still more preferably C3-5) hydrocarbon group, and t and u are the average numbers of moles added, each independently representing the number of 1.0 or greater (preferably 5.0 to 30.0 and more preferably 10.0 to 25.0).

In formula (6), R61 represents a monovalent C1-8 (preferably C1-4) hydrocarbon group, and v and w are the average numbers of moles added, each independently representing the number of 1.0 or greater (preferably 1.0 to 30.0 and more preferably 5.0 to 30.0).

In formula (7), R71 represents a monovalent C1-12 (preferably C1-8 and more preferably C1-4) hydrocarbon group, and x is the average number of moles added, representing the number of 1.0 or greater (preferably 1.0 to 30.0 and more preferably 4.0 to 15.0).

The compound represented by formula (5) is a polyoxyethylene polyoxypropylene alkyl ether, and is a polyether monool having a structure in which ethylene oxide and propylene oxide are addition-polymerized in a block form. The hydroxyl group at the terminal of this polyether monool interacts with the surface functional group of the carbon black by hydrogen bonding and acts as a dispersing agent for the carbon black. Also, the compound represented by formula (5) has a structure that is compatible with polycarbonate urethane, making it easier to disperse carbon black in polycarbonate urethane.

Ethylene oxide is introduced into the structure to make the additive uniformly present in the polycarbonate urethane. It is believed that such effects are obtained because ethylene groups in ethylene oxide are compatible with hydrophobic hydrocarbon groups in polycarbonate urethane. Propylene oxide is also introduced into the structure to improve the dispersibility of carbon black dispersed in the surface layer. It is believed that the side chain methyl group of propylene oxide interacts with carbon black to improve the dispersibility of carbon black.

R51, which is a monovalent C1-12 hydrocarbon group, has been introduced into the structure in order to allow the additive to exist in the polycarbonate urethane uniformly. It is believed that such effects are obtained because monovalent hydrocarbon groups are compatible with hydrophobic hydrocarbon groups in polycarbonate urethane. When the number of carbon atoms is 12 or less, steric hindrance with polycarbonate urethane is less likely to occur, and additives are likely to present uniformly.

Then, since the compound represented by formula (5) has a monool structure, reactivity is poorer than that of a diol. As a result, the compound represented by formula (5) is less likely to be incorporated into the polyurethane during the urethane reaction between the isocyanate and the polyol, and the introduction of an ether structure into polycarbonate urethane is less likely to cause a decrease in the resistance of the polyurethane.

Polyoxyethylene polyoxypropylene alkyl ethers can be obtained by using a commercial product or by synthesis. The polyoxyethylene polyoxypropylene alkyl ether can be synthesized through step (b) after step (a) below. The step (b) may be performed on the commercial product of the compound obtained in the step (a).

Step (a): Step for reacting an alcohol with ethylene oxide

Step (b): Step for reacting the product obtained in step (a) with propylene oxide For example, the step (a) can be performed by adding ethylene oxide to an alcohol at 50° C. to 200° C., more preferably 100° C. to 160° C., in the presence of a catalyst and reacting them.

The boiling point of ethylene oxide is 10.7° C. and is a gas at the above temperature. For this reason, it is preferable to perform the reaction in a pressurized environment in a sealed vessel. The pressure is preferably 0.1 to 1.0 MPa. The reaction time is not particularly limited, but 1 to 5 hours are preferable to reduce unreacted ethylene oxide, and 1 to 3 hours are more preferable.

As the catalyst, an acid catalyst or an alkali catalyst may be used. Alkali catalysts are preferable to facilitate purification after completion of the reaction. Examples of alkali catalysts may include hydroxides of alkali metals, such as sodium hydroxide and potassium hydroxide; hydroxides of alkaline earth metals, such as calcium hydroxide and barium hydroxide; ammonium hydroxide; tertiary amines; and the like. From the viewpoint of ease of reaction and reaction efficiency, sodium hydroxide and potassium hydroxide are preferable, and potassium hydroxide is particularly preferable.

Examples of acid catalysts may include Broensted acids such as sulfuric acid and phosphoric acid, and Lewis acids such as stannic chloride and boron trifluoride.

The amount of the catalyst used is preferably 0.1 to 5 mol % relative to 1 mol of the alcohol. Ethylene oxide reacts with water to form ethylene glycol, so moisture is avoided as much as possible, and if necessary, dehydration treatment may be performed prior to the reaction in the step (a).

The step (b) can be performed under the conditions described in the column for explaining the step (a). The boiling point of propylene oxide is 34.2° C. and is gas at the reaction temperature of 50° C. to 200° C. Therefore, propylene oxide is preferably reacted in a pressurized environment in a sealed vessel. The catalyst used in the step (a) may be used as such or may be added newly. When the catalyst is added newly, the same catalyst as the catalyst used in the step (a) is preferable.

The compound represented by formula (6) is a polyetheramine (monoamine) having a structure in which ethylene oxide and propylene oxide are addition-polymerized in a block form. The amino group at the terminal of this polyetheramine interacts with the surface functional group of the carbon black by hydrogen bonds and acts as a dispersing agent for the carbon black. Ethylene oxide and propylene oxide have the same action as the compound represented by formula (5) above.

Since R61, which is a monovalent C1-8 hydrocarbon group, is compatible with a hydrophobic hydrocarbon group in the polycarbonate urethane, the additive is likely to be present uniformly in the polycarbonate urethane.

A polyetheramine can be obtained by using a commercial product or by synthesis. A polyetheramine can be synthesized through step (d) after step (c) below.

Step (c): an oxidation step of oxidizing a compound represented by formula (5) that is a secondary alcohol Step (d): an amination step of subjecting the product obtained in the step (c) to a reductive amination reaction The step (c) is a step for carrying out a reaction to form a ketone in an oxidation reaction of a secondary alcohol. Examples of oxidation reactions used in ketone synthesis by oxidation of a secondary alcohol may include oxidation reactions using heavy metal salts such as chromic acid and manganese dioxide or derivatives thereof and heavy metal salts-free oxidation reactions using dimethyl sulfoxide (DMSO) or hypohalous acid such as hypochlorous acid.

Any method may be used, but in view of the environmental impact of heavy metals, heavy metal salts-free oxidation reactions using dimethyl sulfoxide (DMSO) or hypohalous acid such as hypochlorous acid are preferable. Furthermore, the method of using hypohalous acid is more preferable because dimethyl sulfoxide (DMSO) can explosively react at room temperature depending on the electrophilic activation reagent used, and low temperatures such as −60° C. may be required in some cases.

Examples of hypohalous acid may include hypochlorites such as sodium hypochlorite or calcium hypochlorite (bleaching powder), and hypobromate such as sodium hypobromate or calcium hypobromate, and a hypochlorite is preferable. These hypohalites are reacted with a compound represented by formula (5), which is a secondary alcohol, in acetic acid to yield a ketone.

When dimethyl sulfoxide (DMSO) is used, an electrophilic activation reagent is additionally used. An electrophilic activation reagent enhances the electrophilic properties of sulfur atoms in dimethyl sulfoxide (DMSO), whereby the sulfur atoms undergo a nucleophilic attack of alcoholic hydroxyl groups. This nucleophilic attack yields a dimethylalkoxysulfonium salt. The dimethylalkoxysulfonium salt is decomposed to yield a ketone and dimethyl sulfide.

Examples of electrophilic activation reagents may include dicyclohexylcarbodiimide (DCC), acetic anhydride, phosphorus pentaoxide, pyridine sulfur trioxide complex, trifluoroacetic anhydride, oxalyl chloride, halogen, and the like.

The step (d) is a step for performing a reductive amination reaction that converts ketone into amine. The reaction is divided into two stages. First, a carbonyl group reacts with an amine to form an iminium cation. Subsequently, the hydride-reducing agent undergoes a nucleophilic attack on the iminium cation to produce an amine. A borohydride reagent is preferably used as the reducing agent. Examples of borohydride reagents may include at least one selected from the group consisting of sodium cyanoborohydride, sodium triacetoxyborohydride, and 2-picoline-borane. Among these, at least one selected from the group consisting of sodium triacetoxyborohydride and 2-picoline-borane, which are less toxic, is preferable, and 2-picoline-borane is further preferable.

Reductive amination reactions with borohydride reagents are less likely to produce iminium cations due to steric hindrance if the substrate has a bulky structure. Therefore, R61 in the compound represented by formula (6) is preferably a monovalent C1-8 hydrocarbon group.

The compound represented by formula (7) is polyoxyethylene alkyl ether acetate. The terminal carboxylic acid in formula (7) interacts with the surface functional groups of the carbon black by hydrogen bonds and acts as a dispersing agent for the carbon black. Since R71, which is a monovalent C1-12 hydrocarbon group, is compatible with a hydrophobic hydrocarbon group in the polycarbonate urethane, the additive is likely to be present uniformly in the polycarbonate urethane.

Polyoxyethylene polyoxypropylene alkyl ether acetate can be obtained by using a commercial product or by synthesis. Polyoxyethylene polyoxypropylene alkyl ether acetate can be synthesized through step (f) after step (e) below. The step (f) may be performed on the commercial product of the compound obtained in the step (e).

Step (e): step of reacting an alcohol with ethylene oxide

Step (f): an oxidation step of oxidizing the product obtained in the step (e)

The step (e) is a step similar to the step (a). Specifically, the method described in the column for explaining the step (a) can be used.

The step (f) is a step for oxidizing a primary alcohol to produce a carboxylic acid. Upon oxidation of a primary alcohol, an aldehyde is first produced, and then the aldehyde is further oxidized to produce a carboxylic acid. Therefore, it is necessary to select the reaction method and conditions that can oxidize a primary alcohol to carboxylic acid.

Examples of methods for obtaining carboxylic acids by oxidation of primary alcohols may include oxidation with an oxidizing agent and catalytic dehydrocatalysis reaction with a catalyst. Examples of oxidizing agents may include permanganates such as potassium permanganate, chromic acid, ruthenium tetroxide, and hypochlorite. Among these, a permanganate is preferable. Examples of catalysts for the dehydrogenation reaction may include palladium, platinum, iridium, rhodium, and manganese.

The compound represented by formula (5), the compound represented by formula (6), and the compound represented by formula (7) are compounds having a function as a dispersing agent for carbon black and high affinity with polycarbonate urethane. Surfactants are usually used as methods for increasing the dispersibility and dispersion stability of carbon black. However, the compound represented by formula (5), the compound represented by formula (6), and the compound represented by formula (7) have a small number of functional groups acting on the surface functional group of carbon black, and thus show a weak surfactant effect and is not commonly used. Nevertheless, the present inventors have found that these compounds act as a dispersing agent for carbon black in polycarbonate urethane by the action described above.

Coupling agents and nonionic surfactants have been utilized as common dispersing agents for carbon black.

As the coupling agent, a silane coupling agent, a titanate coupling agent, and an aluminum coupling agent are used, and as the nonionic surfactant, a polyester or polyether-based nonionic surfactant is used. However, it is believed that if these dispersing agents are added in an amount sufficient to enhance the dispersibility of the carbon black in polycarbonate urethane, for example, 50% by mass or more relative to the carbon black, the conductivity of carbon black and binder resin is inhibited. In contrast, it is believed that the required dispersion of carbon black cannot be obtained with the amount of the dispersing agent added not to inhibit the conductivity of carbon black or binder resin.

If the carbon black surface is covered with an insulating material such as a silane coupling agent, it is impossible to behave as a pseudo capacitor, resulting in high impedance and surface potential.

The content of at least one selected from the group consisting of the compound represented by formula (5), the compound represented by formula (6), and the compound represented by formula (7) in the surface layer-forming coating liquid is preferably 3.0% to 7.0% by mass based on the solid content in the surface layer-forming coating liquid. This content indicates the total content if multiple compounds are included.

The total content is preferably 18.9 to 46.0 parts by mass based on 100 parts by mass of carbon black in the surface layer-forming coating liquid.

When the content of the additive in the surface layer-forming coating liquid is within the above range, the dispersibility of the carbon black into polyurethane is further improved, and the desired dispersion state can be easily achieved.

Confirmation of the presence of additives in the surface layer and quantitative evaluation can be analyzed in the following manner.

First, the surface layer of the electrophotographic conductive roller is cut out to obtain a slice. Then, by using, for example, $^{1}H$-NMR, $^{13}C$-NMR, XPS, and FT-IR on the slice, the carbonate structure of the binder resin, and the ether structure, amine structure, and carboxylic acid structure of additives can be detected in the surface layer. The presence of additives may be monitored from the ratio of peaks, or the like in each measurement, and the ratio may be calculated to perform quantitative evaluation.

Furthermore, the proportion between additives incorporated and not incorporated during the polymerization reaction of a resin can be calculated by immersing the slice in an organic solvent such as 2-butanone (methyl ethyl ketone; MEK) overnight to extract the additives, and employing $^{1}$H-NMR, $^{13}$C-NMR, XPS, and FT-IR on the extract liquid and the extracted slice.

Examples of structures in which at least one selected from the group consisting of a compound represented by formula (5) and a compound represented by formula (6) is bound to polyurethane (the structure reacted during polymerization of the polyurethane) may include the followings:

In the case of a compound represented by formula (5), a structure in which the compound represented by formula (5) is urethanized to be incorporated into the structure of polyurethane In the case of a compound represented by formula (6), a structure in which the compound represented by formula (6) is ureanized to be incorporated into the structure of polyurethane Roughness-Forming Particles The surface layer may contain roughness-forming particles in order to provide roughness to the surface of the surface layer. The roughness-forming particles are not particularly limited, but resin particles are preferable, and spherical particles are more preferable.

The particle diameter of the roughness-forming particles is not particularly limited, but, for example, preferably in the range of 1 to 150 μm and more preferably in the range of 5 to 30 μm.

Resin particles are not particularly limited, but examples thereof may include urethane resin particles, acrylic resin particles, phenol resin particles, silicone resin particles, polyacrylonitrile resin particles, polystyrene resin particles, polyurethane resin particles, nylon resin particles, polyethylene resin particles, and polypropylene resin particles. Preferably, the particles are urethane resin particles.

The content of the roughness-forming particles is not particularly limited, but, for example, preferably 10 to 20 parts by mass based on 100 parts by mass of the resin component forming the surface layer.

Production Method

Methods for forming the surface layer are not particularly limited, but examples thereof may include methods including spraying, dip coating, or roll coating using a coating composition. For example, a surface layer can be formed by applying the surface layer-forming coating liquid on the elastic layer by a known method and heating and drying the coating liquid.

The conditions for heating and drying are not particularly limited, but, for example, methods of drying under conditions at 120° C. to 200° C. may be mentioned. The time for drying is not particularly limited but may be, for example, 0.5 to 2.0 hours.

The thickness of the surface layer is not particularly limited but is preferably 1 to 50 μm and more preferably 5 to 20 μm.

Process Cartridge and Electrophotographic Image Forming Apparatus

Figure 2:
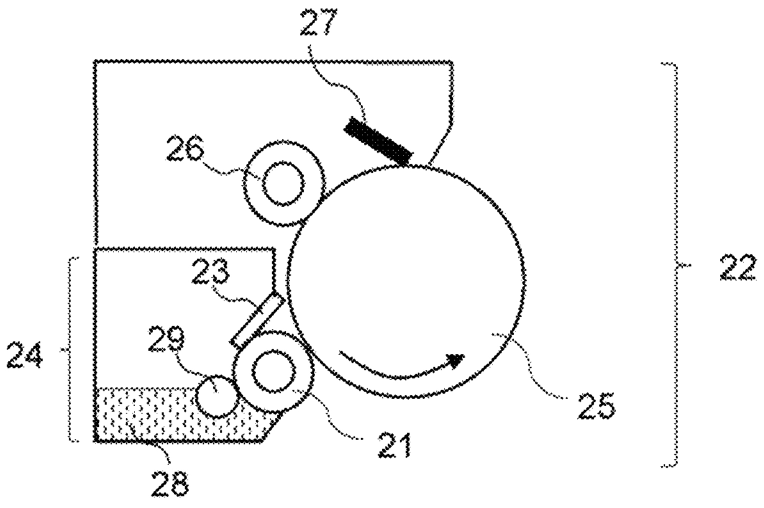
FIG. 2 is a schematic view of a process cartridge.

The electrophotographic conductive roller according to the present disclosure can be suitably used as a developing roller, a toner supply roller, and a developing sleeve in a process cartridge. FIG. 2 is a schematic sectional view of an example of the process cartridge according to one aspect of the present disclosure. In FIG. 2, the electrophotographic conductive roller is mounted as a developing roller 21. A process cartridge 22 is configured to be attachable and detachable to the main body of the electrophotographic image forming apparatus. The process cartridge 22 includes a developing apparatus 24 provided with a developing roller 21 and a developing blade 23; a photoreceptor 25; a charging roller 26; and a cleaning blade 27, which are integrated together. The developing apparatus 24 is further filled with a toner 28. The toner 28 is supplied to the surface of the developing roller 21 by the toner supply roller 29, and a layer of the toner 28 having a predetermined thickness is formed on the surface of the developing roller 21 by the developing blade 23.

The developing roller 21 is in contact with the photoreceptor 25 and is driven to rotate at a predetermined peripheral speed ratio with respect to the photoreceptor 25. A predetermined bias is applied to the developing roller 21 to develop and visualize the electrostatic latent image on the photoreceptor 25 using the toner 28.

The toner supply roller 29 is in contact with the developing roller 21, penetrates in a predetermined penetration level, and rotates in the forward or reverse direction to the rotational direction of the developing roller 21. The toner supply roller 29 is designed to have a potential difference with respect to the developing roller 21, depending on the purpose.

One end of the developing blade 23 is fixed to the developing apparatus 24, and the other free end is arranged in contact with the developing roller 21 in a counter direction to the rotational direction of the developing roller 21. By arranging the developing blade 23 in contact with the developing roller 21, the amount of the toner on the developing roller 21 is regulated and made thin to form a toner layer having a uniform thickness. A predetermined bias is applied to the developing blade 23 to charge the toner 28.

An electrophotographic image forming apparatus has a photoreceptor and a developing roller that supplies a developer to an electrostatic latent image formed on the photoreceptor. The developing roller is the electrophotographic conductive roller of the present disclosure.

Figure 3:
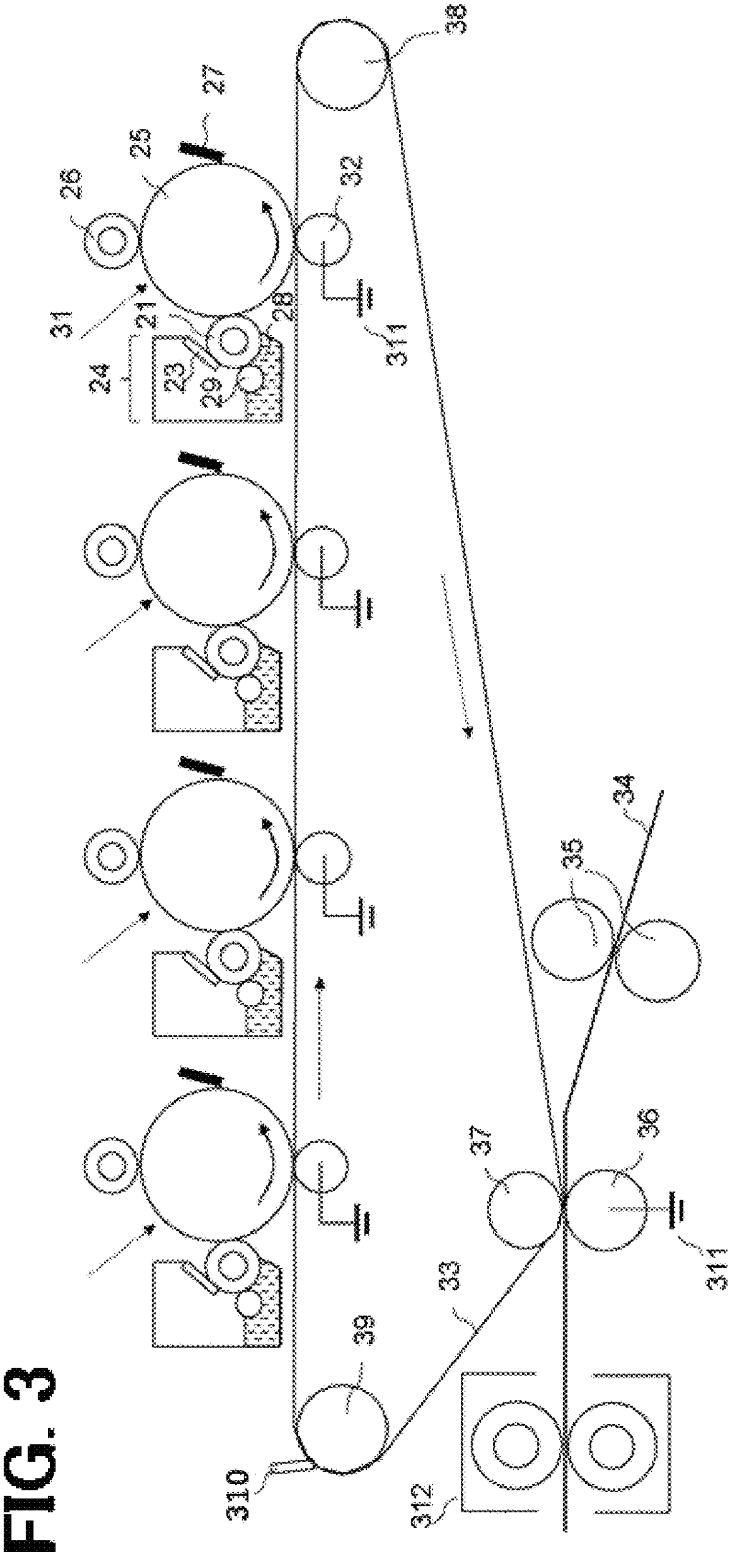
FIG. 3 is a schematic view of an electrophotographic image forming apparatus.

FIG. 3 is a schematic cross-sectional view illustrating an example of an electrophotographic image forming apparatus in which an electrophotographic conductive roller according to the present disclosure is mounted as a developing roller of a contact type developing apparatus using a one-component toner. The developing apparatus 24 includes a toner 28 as one-component toner, a developing roller 21, a toner supply roller 29 that supplies the toner to the developing roller 21, and a developing blade 23 for regulating the thickness of the toner layer on the developing roller 21. The developing roller 21 is located in an opening in the developing apparatus 24 extending in the longitudinal direction and is installed in contact with the photoreceptor 25. The photoreceptor 25, the charging roller 26, and the cleaning blade 27 may be disposed in the main body of the electrophotographic image forming apparatus. The developing apparatus 24 is provided with respective color toners of black, cyan, magenta, and yellow, which makes it possible to perform color printing.

The printing operation of the electrophotographic image forming apparatus will be described below. The photoreceptor 25 rotates in the direction of the arrow and is uniformly charged by a charging roller 26 for charging the photoreceptor 25. Next, an electrostatic latent image is formed on the surface of the photoreceptor 25 by the laser light 31, which is an exposure means. The electrostatic latent image is visualized (developed) as a toner image by applying the toner 28 from the developing roller 21 disposed in contact with the photoreceptor 25 by the developing apparatus 24. The development is a so-called reversal development for forming a toner image on an exposed portion.

The toner image formed on the photoreceptor 25 is transferred to an endless belt-shaped intermediate transfer member 33 by a transfer roller 32 that is a transfer member.

The paper sheet 34, which is a recording medium, is fed into the apparatus by the paper feed roller 35 and the secondary transfer roller 36, and is transported to the nip part between the secondary transfer roller 36 and the driven roller 37 together with the intermediate transfer member 33 having a toner image, and the toner image is transferred to the paper sheet 34. The intermediate transfer member 33 is operated by a driven roller 37, a driver roller 38, and a tension roller 39. The toner remaining on the intermediate transfer member is cleaned by the cleaning apparatus 310.

A voltage is applied from a bias power source 311 to the developing roller 21, the developing blade 23, the transfer roller 32, and the secondary transfer roller 36. The paper sheet 34 to which the toner image is transferred is subjected to fixing by a fixing apparatus 312 and ejected to the outside of the apparatus, and the printing operation is finished. Meanwhile, the transfer residual toner remaining on the photoreceptor 25 without being transferred is scraped off by a cleaning blade 27, which is a cleaning member for cleaning the surface of the photoreceptor. The cleaned photoreceptor 25 repeats the above printing operation.

Surface Potential

A method of measuring a surface potential is described. The surface potential is measured by using a charge amount measuring apparatus (trade name: DRA-2000L, manufactured by Quality Engineering Associates, Inc.). Specifically, a corona discharger having a grid portion with 3.0 mm in width is placed under an environment at a temperature of 23° C. and a relative humidity of 50% such that the distance between the grid portion and the outer surface of the electrophotographic conductive roller be 1.0 mm and the width direction of the grid be aligned with the axial direction of the electrophotographic conductive roller. Subsequently, a voltage of 8 kV is applied to the grid portion, and the corona discharger is relatively moved along the axial direction of the electrophotographic conductive roller at a speed of 400 mm/sec to charge the outer surface of the electrophotographic conductive roller. At this time, the potential on the outer surface at 0.06 seconds after the passage of the grid is measured. The measured potential is the surface potential of the electrophotographic conductive roller. Thus, the degree of charge-up on the outer surface of the electrophotographic conductive roller can be evaluated.

Figure 4:
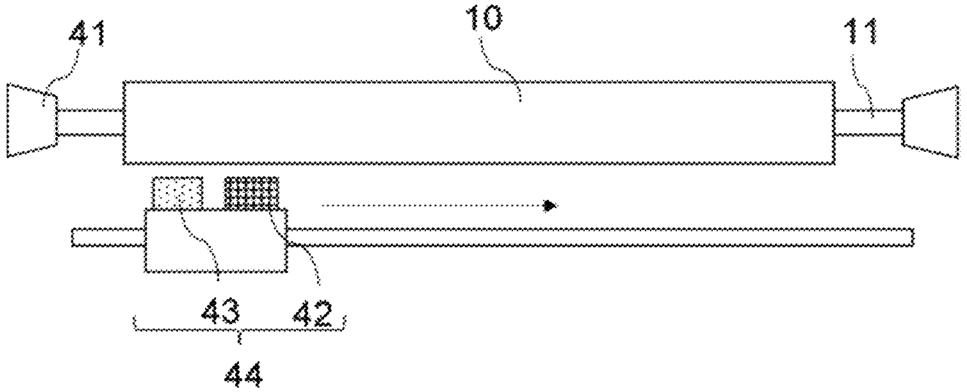
FIG. 4 is a schematic view illustrating an example of an apparatus for measuring the surface potential of the electrophotographic conductive roller.

The surface potential of the electrophotographic conductive roller can be measured by the apparatus illustrated in FIG. 4, for example. Both end parts of the substrate 11 of the electrophotographic conductive roller 10 are held by a chuck 41, and a measuring unit 44 in which a corona discharger 42 and a surface electrometer 43 are arranged in parallel at an interval of 25 mm is arranged facing the surface of the electrophotographic conductive roller at an interval of 1.0 mm distance. A voltage of 8 kV is applied to the grid portion of the corona discharger 42 in a state where the electrophotographic conductive roller 10 is stationary, and the measuring unit 44 is moved in the axial direction of the electrophotographic conductive roller 10 at a speed of 400 mm/sec. At this time, the surface potential at 0.06 seconds after the passage of the corona discharger 42 is measured by the surface electrometer 43.

The chuck 41 is rotatable and can measure the surface potential while changing the phase of the electrophotographic conductive roller.

The surface potential of the electrophotographic conductive roller indicates the ease of residual charges on the surface of the electrophotographic conductive roller, which is a physical property value indicating the degree of overcharge of the toner. The toner carrying an electric charge is electrically attracted to the surface of the electrophotographic conductive roller. If residual charges are present on the surface of the outer surface of the electrophotographic conductive roller, this electrical attachment force further increases, and the charged toner continues to adhere to the electrophotographic conductive roller. Since the adhered toner continues to remain on the roller, the chance of friction with surrounding members increases, and the triboelectric charge quantity increases further. As a result, excessive charging of the toner may occur.

The maximum of the surface potential is preferably less than 20.0 V. By satisfying this range, the electrical attachment force between the toner and the electrophotographic conductive roller is suppressed. Therefore, the contact opportunity between the toner and the electrophotographic conductive roller is reduced, thereby reducing the triboelectric charge quantity and making it easier to suppress toner overcharging At 0.06 seconds after the passage of the grid portion of the corona discharger, it imitates a model with high process speed.

For measuring the surface potential, a voltage of 8 kV is applied to the grid portion, and the corona discharger is relatively moved along the axial direction of the electrophotographic roller at a speed of 400 mm/sec, and the maximum value at 0.06 seconds after the passage of the grid portion of the corona discharger is taken as the surface potential of the electrophotographic conductive roller.

The surface potential of the electrophotographic conductive roller is more preferably 10.0 V or less, and still more preferably 7.0 V or less. The lower the maximum value of the potential on the outer surface, the more preferable, and the lower limit is not particularly limited. The surface potential of the electrophotographic conductive roller is, for example, preferably 0.0 to 20.0 V, more preferably 0.0 to 10.0 V, and still more preferably 0.0 to 7.0 V.

The surface potential of the electrophotographic conductive roller can be controlled by adjusting the dispersed particle size of carbon black. For example, when the dispersed particle size of carbon black is reduced, the inter-wall distances approach uniformity when viewed across the entire surface layer, so that a conductive path is difficult to form, resistance is increased, and capacitance is small, resulting in higher impedance. The surface potential can be lowered by the amount of charge that can be stored in the pseudo-capacitor component as the resistance becomes higher and the influence of the capacitance component becomes greater.

EXAMPLES

The following examples will be used to explain the present disclosure, but the present disclosure is not limited to these.

1. Preparation of Raw Materials for Forming Surface Layer, and Production

1-1. Preparation of Raw Polyol and Production Example

The raw polyol used for the surface layer of the present disclosure will be described below.

Measurement of Number Average Molecular Weight of Raw Polyol

The apparatus used to measure the number average molecular weight (Mn) in the present production example, and conditions are as follows: Measuring instrument: HLC-8120 GPC (manufactured by Tosoh Corporation)

Column: TSKgel Super HZMM (manufactured by Tosoh Corporation)×2

Solvent: Tetrahydrofuran (THF) (20 mmol/l triethylamine added)

Temperature: 40° C.

Frow rate of THF: 0.6 ml/min

As the measuring sample, 0.1-mass % THF solutions were used. Furthermore, measurements were performed using an RI (refraction index) detector as a detector.

Calibration curves were prepared using TSK standard polystyrene A-1000, A-2500, A-5000, F-1, F-2, F-4, F-10, F-20, F-40, F-80, and F-128 manufactured by Tosoh Corporation as standard samples for preparing calibration curves. Based on these calibration curves, the number average molecular weight was determined from the retention time of the obtained measuring samples.

Preparation of Raw Polyol

A-1 to A-16, which are 16 types of raw polyols listed in Table 1 below, were purchased commercially. Also, the raw polyols A-17 and A-18 were synthesized according to the procedures shown below.

TABLE 1

| No. | Raw polyol |
|---|---|
| A-1 | DURANOL T5652 Mn = 2000 (Manufactured by Asahi Kasei Chemicals Corp.) |
| A-2 | DURANOL G4672 Mn = 2000 (Manufactured by Asahi Kasei Chemicals Corp.) |
| A-3 | DURANOL G3452 Mn = 2000 (Manufactured by Asahi Kasei Chemicals Corp.) |
| A-4 | DURANOL G4692 Mn = 2000 (Manufactured by Asahi Kasei Chemicals Corp.) |
| A-5 | KURARAY POLYOL C2050 Mn = 2000 (Manufactured by Kuraray Co., Ltd.) |
| A-6 | KURARAY POLYOL C2090 Mn = 2000 (Manufactured by Kuraray Co., Ltd.) |
| A-7 | KURARAY POLYOL C3090 Mn = 3000 (Manufactured by Kuraray Co., Ltd.) |

TABLE 1-continued

| No. | Raw polyol |
|---|---|
| A-8 | KURARAY POLYOL C2015N Mn = 2000 (Manufactured by Kuraray Co., Ltd.) |
| A-9 | KURARAY POLYOL C2060N Mn = 2000 (Manufactured by Kuraray Co., Ltd.) |
| A-10 | NIPPOLAN 982 Mn = 2000 (Manufactured by Tosoh Corp.) |
| A-11 | ETERNACOLL UH-200 Mn = 2000 (Manufactured by Ube Industries, Ltd.) |
| A-12 | ETERNACOLL UH-300 Mn = 3000 (Manufactured by Ube Industries, Ltd.) |
| A-13 | ETERNACOLL UC-100 Mn = 2000 (Manufactured by Ube Industries, Ltd.) |
| A-14 | ETERNACOLL UM-90(1:1) Mn = 900 (Manufactured by Ube Industries, Ltd.) |
| A-15 | ETERNACOLL UM-90(1:3) Mn = 900 (Manufactured by Ube Industries, Ltd.) |
| A-16 | Oxymer M112 Mn = 1000 (Manufactured by Perstorp Japan Co., Ltd.) |

Synthesis of Raw Polyol A-17

Under a nitrogen atmosphere, 100.0 g of 1,3-propanediol, 49.4 g of adipic acid, and 69.5 g of ethylene carbonate were mixed and heated, and ethylene glycol and water formed from the reaction system were distilled off while raising the temperature to 200° C. After ethylene glycol and water were distilled off, 15 ppm of titanium tetraisopropoxide was added, and the polycondensation reaction was further proceeded under a reduced pressure of 266.7 Pa. The reaction liquid was cooled to room temperature to yield raw polyol A-17. The number average molecular weight of the resulting raw polyol A-17 was 2030.

Synthesis of Raw Polyol A-18

Raw polyol A-18 was synthesized in the same manner as the synthesis of raw polyol A-17, except that the diol and dicarboxylic acid listed in Table 2 below were used. The number average molecular weight of raw polyol A-18 was 2040.

TABLE 2

| Raw polyol No. | Diol (Parts by mass) | Dicarboxylic acid (Parts by mass) | Ethylene carbonate (Parts by mass) | Ester group/ carbonate group (Molar ratio) | Number average molecular weight |
|---|---|---|---|---|---|
| A-17 | 1,3-Propanediol (100.0) | Adipic acid (49.4) | 69.5 | 3/7 | 2030 |
| A-18 | 1,6-Hexanediol (100.0) | Sebacic acid (102.8) | 19.2 | 7/3 | 2040 |

1-2. Preparation of Raw Isocyanates B-1 to B-6

Raw isocyanates listed in Table 3 below were prepared.

TABLE 3

| No. | Raw isocyanate |
|---|---|
| B-1 | Diphenylmethane diisocyanate (MDI) (Trade name: Millionate MT, Manufactured by Tosoh Corp.) |
| B-2 | Polymethylene polyphenyl polyisocyanate (polymeric MDI) (Trade name: Millionate MR200, Manufactured by Tosoh Corp.) |
| B-3 | Tolylene diisocyanate (TDI) (Trade name: Coronate T-80, Manufactured by Tosoh Corp.) |
| B-4 | Tolylene diisocyanate (TDI) trimethylolpropane adduct (Trade name: Coronate L, Manufactured by Tosoh Corp.) |

TABLE 3-continued

| No. | Raw isocyanate |
|---|---|
| B-5 | Hexamethylene diisocyanate (Trade name: Duranate 50M-HDI, Manufactured by Asahi Kasei Chemicals Corp.) |
| B-6 | Isocyanurate trimer of hexamethylene diisocyanate (Trade name: Duranate TPA-100, Manufactured by Asahi Kasei Chemicals Corp.) |

1-3. Production Examples of Hydroxyl-Terminated Prepolymers C-1 to C-14 Synthesis of Hydroxyl-Terminated Prepolymer C-1

Under a nitrogen atmosphere, the materials listed in Table 4 below were heated and stirred at a temperature of 90° C. for 3 hours to cause a reaction. After that, 2-butanone (MEK) was added to the resulting reaction to prepare a hydroxyl-terminated prepolymer C-1 as a solution with a solid content of 50% by mass.

TABLE 4

| Material | Parts by mass |
|---|---|
| Raw polyol A-1 (Trade name: Duranol T5652, Manufactured by Asahi Kasei Chemicals Corp.) | 100 |

TABLE 4-continued

| Material | Parts by mass |
|---|---|
| Raw isocyanate B-1 (Trade name: Millionate MT, Manufactured by Tosoh Corp.) | 6.3 |

Synthesis of Hydroxyl-Terminated Prepolymers C-2 to C-14

Hydroxyl-terminated prepolymers C-2 to C-14 were synthesized in the same manner as in the synthesis of the hydroxyl-terminated prepolymer C-1, except that raw polyol and raw isocyanate listed in Table 5 below were used.

The chemical structures of these hydroxyl-terminated prepolymers C-1 to C-14 were identified using $^{1}H$-NMR and $^{13}C$-NMR. It is to be noted that in Table 5, m, n, o, p, q, r, and s in formulas (1), (2), (3), and (4) are the average numbers of moles added.

TABLE 5

| Hydroxyl group-terminated prepolymer No. | Raw polyol No. | Raw polyol Parts by mass | Raw isocyanate No. | Raw isocyanate Parts by mass | Structure contained in the molecule | | | |
|---|---|---|---|---|---|---|---|---|
| C-1 | A-1 | 100 | B-1 | 6.3 | Formula (1) | R11═$(CH_2)_5$ | R12═$(CH_2)_6$ | m, n = 6.9 |
| C-2 | A-2 | 100 | B-1 | 5.7 | Formula (1) | R11═$(CH_2)_4$ | R12═$(CH_2)_6$ | m = 10.7, n = 4.6 |
| C-3 | A-3 | 100 | B-1 | 6.3 | Formula (1) | R11═$(CH_2)_3$ | R12═$(CH_2)_4$ | m, n = 8.8 |
| C-4 | A-4 | 100 | B-1 | 6.3 | Formula (1) | R11═$(CH_2)_4$ | R12═$(CH_2)_6$ | m = 14.5, n = 1.6 |
| C-5 | A-5 | 100 | B-1 | 6.3 | Formula (1) | R11═$(CH_2)_6$ | R12═$(CH_2)_2$—CHMe—$(CH_2)_2$ | m, n = 6.5 |
| C-6 | A-6 | 100 | B-1 | 6.3 | Formula (1) | R11═$(CH_2)_6$ | R12═$(CH_2)_2$—CHMe—$(CH_2)_2$ | m = 1.3, n = 11.8 |
| C-7 | A-7 | 100 | B-1 | 4.2 | Formula (1) | R11═$(CH_2)_6$ | R12═$(CH_2)_2$—CHMe—$(CH_2)_2$ | m = 2.0, n = 18.0 |
| C-8 | A-8 | 100 | B-1 | 6.3 | Formula (1) | R11═$(CH_2)_9$ | R12═$CH_2$—CHMe—$(CH_2)_6$ | m = 6.5, n = 3.5 |
| C-9 | A-9 | 100 | B-1 | 6.3 | Formula (1) | R11═$(CH_2)_9$ | R12═$CH_2$—CHMe—$(CH_2)_6$ | m = 3.5, n = 6.5 |
| C-10 | A-10 | 100 | B-5 | 4.3 | Formula (2) | | o = 9.1, p = 5.5 | |
| C-11 | A-17 | 100 | B-1 | 6.3 | Formula (3) | R31═$(CH_2)_3$ | R32═$(CH_2)_4$ | q = 12, r = 5.1 |
| C-12 | A-18 | 100 | B-1 | 6.3 | Formula (3) | R31═$(CH_2)_6$ | R32═$(CH_2)_8$ | q = 2.7, r = 6.3 |
| C-13 | A-11 | 100 | B-1 | 6.3 | Formula (4) | | R41═$(CH_2)_6$ | s = 13.2 |
| C-14 | A-1 | 100 | B-3 | 4.8 | Formula (1) | R11═$(CH_2)_5$ | R12═$(CH_2)_6$ | m, n = 6.9 |

In the table, Me represents a methyl group.

Production Example of Hydroxyl-Terminated Prepolymer C-15

In a reaction vessel, a mixture of 144.2 g of dry tetrahydrofuran and 172.2 g of dry 3-methyltetrahydrofuran (molar mixing ratio 50:50) was retained at a temperature of 10° C. Next, 13.1 g of 70% aqueous perchloric acid solution and 120 g of acetic anhydride were added, and the reaction was performed for 1.5 hours. Then, the reaction mixture was poured into 600 g of 2000 aqueous sodium hydroxide solution and purified. Furthermore, the remaining water and solvent components were removed under reduced pressure to yield liquid polyether diol C-15. The number average molecular weight of the resulting polyether diol was 1000.

1-4. Production Examples of Isocyanato Group-Terminated Prepolymers D-1 to D-9

Synthesis of Isocyanato Group-Terminated Prepolymer D-1

Under a nitrogen atmosphere, the materials listed in Table 6 below were heated and stirred at a temperature of 90° C. for 3 hours to cause a reaction. After that, 2-butanone (MEK) was added to the resulting reaction to prepare a solution with a solid content of 50% by mass, and a hydroxyl-terminated prepolymer D-1 was synthesized.

TABLE 6

| Material | Parts by mass |
|---|---|
| Raw polyol A-10 (Trade name: NIPPOLAN 982, Manufactured by Tosoh Corp.) | 100 |
| Raw polyisocyanate B-2 (Trade name: Millionate MR200, Manufactured by Tosoh Corp.) | 33.5 |

Synthesis of Isocyanato Group-Terminated Prepolymers D-2 to D-9

Isocyanato group-terminated prepolymers D-2 to D-9 were prepared in the same manner as in the synthesis of the isocyanato group-terminated prepolymers D-1, except that starting materials of the type and amount listed in Table 7 below were used.

The chemical structures of these isocyanato group-terminated prepolymers D-1 to D-9 were identified using $^{1}$H-NMR and $^{13}$C-NMR. It is to be noted that in Table 7, m, n, o, p, q, r, and s in structural formulas (1), (2), (3), and (4) are the average numbers of moles added.

TABLE 7

| Isocyanato group-terminated prepolymer No. | Raw polyol No. | Raw polyol Parts by mass | Raw isocyanate No. | Raw isocyanate Parts by mass | Structure contained in the molecule | | | |
|---|---|---|---|---|---|---|---|---|
| D-1 | A-10 | 100 | B-2 | 33.5 | Formula (2) | | | o = 9.1, p = 5.5 |
| D-2 | A-14 | 100 | B-6 | 78.4 | Formula (1) | $R11{=}(CH_2)_6$ | 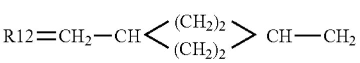 | m, n = 2.7 |
| D-3 | A-15 | 100 | B-6 | 78.4 | Formula (1) | $R11{=}(CH_2)_6$ | 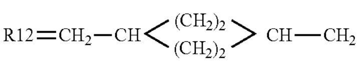 | m = 4.1, n = 1.4 |
| D-4 | A-13 | 100 | B-6 | 70.3 | Formula (4) | | 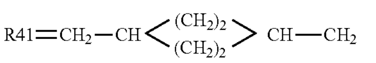 | s = 5.8 |
| D-5 | A-11 | 100 | B-2 | 33.5 | Formula (4) | | $R41{=}(CH_2)_6$ | s = 13.2 |
| D-6 | A-12 | 100 | B-2 | 28.2 | Formula (4) | | $R41{=}(CH_2)_6$ | s = 20.1 |
| D-7 | A-16 | 100 | B-6 | 70.3 | Formula (4) | | $R41{=}CH_2{-}CEtBu{-}CH_2$ | s = 4.6 |
| D-8 | A-10 | 100 | B-4 | 102.2 | Formula (2) | | o = 9.1, p = 5.5 | |
| D-9 | A-1 | 100 | B-2 | 33.5 | Formula (1) | $R11{=}(CH_2)_6$ | $R12{=}(CH_2)_6$ | m:n = 1:1 |

In the table, Et represents an ethyl group, and flu represents an n-butyl group.

Synthesis of Isocyanato Group-Terminated Prepolymer D-10

Under a nitrogen atmosphere, 200.0 g of polyether diol C-15 was added dropwise gradually to 76.5 g of polymeric MDI (trade name: Millionate MR-200: manufactured by Tosoh Corporation) in a reaction vessel while maintaining the temperature in the reaction vessel at 65° C. After the end of the dropwise addition, the reaction was performed at a temperature of 65° C. for 2 hours. The resulting reaction mixture was cooled to room temperature to yield isocyanato group-terminated prepolymer D-10.

2. Preparation of Additive Raw Materials Used for Surface Layer, and Production

2-1. Preparation of Polyoxyethylene Polyoxypropylene Alkyl Ether, and Production Example

Preparation of Polyoxyethylene Polyoxypropylene Alkyl Ether

Polyoxyethylene polyoxypropylene alkyl ethers E-1 to E-5, listed in Table 8 below, were purchased commercially. Polyoxyethylene polyoxypropylene alkyl ethers E-6 and E-7 were synthesized according to the procedures shown below.

Synthesis of Polyoxyethylene Polyoxypropylene Alkyl Ether E-6

An autoclave equipped with a stirring apparatus, a temperature control apparatus, and an automated charging apparatus was charged with 169.3 g of 1-octanol (manufactured by Tokyo Chemical Industry Co., Ltd.) and 3.0 g of potassium hydroxide, and dehydration was performed at 110° C. and 1.2 kPa for 30 minutes. After completion of dehydration, nitrogen substitution was performed, and after the temperature was raised to 150° C., 858.0 g (15 mol with respect to alcohol) of ethylene oxide was charged. The reaction was performed at 150° C. for 1 hour to yield ethylene oxide adduct with an average number of moles added of 15.

After cooling the resulting ethylene oxide adduct to 130° C., 1132.6 g (15 mol with respect to alcohol) of propylene oxide was charged. After the completion of charging, the reaction was performed at 130° C. for 5 hours to yield a polyoxyethylene polyoxypropylene octyl ether adduct that was a block polymer having an average number of moles of ethylene oxide added of 15 and an average number of propylene oxide added of 15.

The resulting polyoxyethylene polyoxypropylene octyl ether adduct was cooled to 80° C., and unreacted ethylene oxide and propylene oxide were removed at 2.5 kPa for 30 minutes. Next, an autoclave was charged with 6.0 g of 90% lactic acid, and the content was stirred at 80° C. for 30 minutes, and polyoxyethylene polyoxypropylene alkyl ether E-6 was obtained by extraction. Table 8 shows the structure of R51 in E-6 and the values of t and u.

Synthesis of Polyoxyethylene Polyoxypropylene Alkyl Ether E-7

An autoclave equipped with a stirring apparatus, a temperature control apparatus, and an automated charging apparatus was charged with 550.0 g of polyoxyethylene methyl ether (trade name: BLAUNON MP-550, manufactured by AOKI OIL INDUSTRIAL Co., Ltd., the average number of moles of ethylene oxide added is 12 mol with respect to alcohol) and 3.0 g of potassium hydroxide, and dehydration was performed at 110° C. and 1.2 kPa for 30 minutes. After completion of dehydration, nitrogen substitution was performed, and after the temperature was raised to 130° C., 871.2 g (12 mol with respect to alcohol) of propylene oxide was charged. After the completion of charging, the reaction was performed at 130° C. for 4 hours to yield a polyoxyethylene polyoxypropylene methyl ether adduct that was a block polymer having an average number of moles of ethylene oxide added of 12 and an average number of propylene oxide added of 12.

The resulting polyoxyethylene polyoxypropylene methyl ether adduct was cooled to 80° C., and unreacted propylene oxide was removed at 2.5 kPa for 30 minutes. Next, an autoclave was charged with 6.0 g of 90% lactic acid, and the content was stirred at 80° C. for 30 minutes, and polyoxyethylene polyoxypropylene alkyl ether E-7 was obtained by extraction. Table 8 shows the structure of R51 in E-7 and the values of t and u.

TABLE 8

| No. | Material | Structure | | |
|---|---|---|---|---|
| E-1 | Polyoxyethylene polyoxypropylene buthyl ether (Trade name: UNILUBE 50MB-26, Manufactured by NOF Corp.) | Formula (5) | R51═$C_4H_9$ | t, u = 17 |
| E-2 | Polyoxyethylene polyoxypropylene buthyl ether (Trade name: UNILUBE 50MB-72, Manufactured by NOF Corp.) | Formula (5) | R51═$C_4H_9$ | t, u = 30 |
| E-3 | Polyoxyethylene polyoxypropylene buthyl ether (Trade name: UNILUBE 50MB-11, Manufactured by NOF Corp.) | Formula (5) | R51═$C_4H_9$ | t = 9, u = 10 |
| E-4 | Polyoxyethylene polyoxypropylene lauryl ether (Trade name: NONION A-13PR, Manufactured by NOF Corp.) | Formula (5) | R51═$C_{12}H_{25}$ | t, u = 5 |
| E-5 | Polyoxyethylene polyoxypropylene lauryl ether (Trade name: NONION A-25B, Manufactured by NOF Corp.) | Formula (5) | R51═$C_{12}H_{25}$ | t, u = 25 |
| E-6 | Polyoxyethylene polyoxypropylene octyl ether | Formula (5) | R51═$C_8H_{17}$ | t, u = 15 |
| E-7 | Polyoxyethylene polyoxypropylene methyl ether | Formula (5) | R51═$CH_3$ | t, u = 12 |

2-2. Preparation of Polyetheramines and Production Example Preparation of Polyetheramine Polyetheramines E-8 and E-9, listed in Table 9 below, were purchased commercially. The polyetheramine E-10 was synthesized according to the procedures shown below.

Synthesis of Polyetheramine E-10

A three-necked flask was fitted with a stirrer, and 1658 g of polyoxyethylene polyoxypropylene octyl ether and 460 ml of acetic acid were charged. To this, 600 ml of 2 mol/L aqueous sodium hypochlorite solution was added dropwise over 1 hour. At this time, the flask was placed in an ice bath to cool so that the temperature be in the range of 15° C. to 25° C. After the end of the dropwise addition, stirring was continued for 1 hour. To the resulting solution, dichloromethane was added, and the aqueous layer was then extracted, post-treated, and purified on a column to yield a ketonized compound of a secondary alcohol.

Subsequently, while cooling at 0° C., 41.4 g of the resulting ketonized compound of a secondary alcohol was added to 250 mL of a methanol-acetic acid mixed solution (volume ratio 10:1), and 2.7 g of 2-picoline-borane was added. The ice bath was removed and stirred overnight at an open system and room temperature. After concentration, the reaction mixture was cooled to 0° C., and 360 ml of 35% aqueous hydrochloric acid solution was then added and stirred at room temperature for 2 hours. An aqueous sodium hydroxide solution was added to make the stirred solution basic, and the aqueous layer was extracted with dichloromethane, post-treated, and purified on a column to yield polyetheramine E-10. Table 9 shows the structure of R61 in E-10 and the values of v and w.

TABLE 9

| No. | Material | Structure | | |
|---|---|---|---|---|
| E-8 | Polyetheramine (Trade name: JEFFAMINE M-2005, Manufactured by Huntsman Corp) | Formula (6) | R61═$CH_3$ | v = 6, w = 29 |
| E-9 | Polyetheramine (Trade name: EFFAMINE M-600, Manufactured by Huntsman Corp) | Formula (6) | R61═$CH_3$ | v = 1, w = 9 |
| E-10 | Polyetheramine | Formula (6) | R61═$C_8H_{17}$ | v, w = 15 |

2-3. Preparation of Polyoxyethylene Alkyl Ether Acetate, Production Example

Preparation of Polyoxyethylene Alkyl Ether Acetate

Polyoxyethylene alkyl ether acetate E-11, listed in Table 10 below, was purchased commercially. Polyoxyethylene alkyl ether acetates E-12 and E-13 were synthesized according to the procedures shown below.

Synthesis of Polyoxyethylene Alkyl Ether Acetate E-12

First, 55.0 g of polyoxyethylene methyl ether (trade name: BLAUNON MP-550, manufactured by AOKI OIL INDUSTRIAL Co., Ltd., the average number of moles of ethylene oxide added is 12 mol with respect to alcohol) and 510 ml of a 1-mol/L aqueous sodium hydroxide solution were mixed, then 71.1 g of potassium permanganate was added, and stirred at room temperature for 6 hours. After that, 760 mL of 2-propanol was then added and stirred for 1 hour to quench the excess potassium permanganate, and the by-product manganese oxide was filtered. The aqueous layer was extracted with dichloromethane and purified to yield E-12, which was polyoxyethylene methyl ether acetate. Table 10 shows the structure of R71 in E-12 and the value of x.

Synthesis of Polyoxyethylene Alkyl Ether Acetate E-13

An autoclave equipped with a stirring apparatus, a temperature control apparatus, and an automated charging apparatus was charged with 169.3 g of 1-octanol (manufactured by Tokyo Chemical Industry Co., Ltd.) and 3.0 g of potassium hydroxide, and dehydration was performed at 110° C. and 1.2 kPa for 30 minutes. After completion of dehydration, nitrogen substitution was performed, and after the temperature was raised to 150° C., 858.0 g (15 mol with respect to alcohol) of ethylene oxide was charged. The reaction was performed at 150° C. for 1 hour to yield ethylene oxide adduct with an average number of moles added of 15.

Then, 77.4 g of the resulting ethylene oxide adduct and 510 ml of 1 mol/L aqueous sodium hydroxide solution were mixed, then 71.1 g of potassium permanganate was added, and stirred at room temperature for 6 hours. After that, 760 ml of 2-propanol was then added and stirred for 1 hour to quench the excess potassium permanganate, and the by-product manganese oxide was filtered. The aqueous layer was extracted with dichloromethane and purified to yield E-13, which was polyoxyethylene octyl ether acetate. Table 10 shows the structure of R71 in E-13 and the value of x.

TABLE 10

| No. | Material | Structure | | |
|---|---|---|---|---|
| E-11 | Polyoxyethylene lauryl ether acetate (Trade name: Taipol Soft ECA-490, Manufactured by TAIKO OIL CHEM. Co., Ltd.) | Formula (7) | R71═$C_{12}H_{25}$ | x = 5 |
| E-12 | Polyoxyethylene methyl ether acetate | Formula (7) | R71═$CH_3$ | x = 11 |
| E-13 | Polyoxyethylene octyl ether acetate | Formula (7) | R71═$C_8H_{17}$ | x = 14 |

3. Production Examples of Surface Layer-Forming Coating Liquids F-1 to F-44

3-1. Preparation of Surface Layer-Forming Coating Liquid F-1

As the material for a surface layer-forming coating liquid F-1, materials of the type and amount listed in Table 11 below were added to the inside of the reaction vessel and stirred. Next, 2-butanone (MEK) was added so that the total solids ratio be 30% by weight, and then mixed with a sand mill. Subsequently, 2-butanone (MEK) was added to adjust the viscosity of the liquid to within the range of 6 to 10 mPa-s to prepare the surface layer-forming coating liquid F-1.

TABLE 11

| Material | Parts by mass |
|---|---|
| Hydroxyl group-terminated prepolymer C-1 | 100 |
| Isocyanato group-terminated prepolymer D-5 | 54.7 |
| Additive E-1 | 7 |
| Carbon black (Trade name: MA8, Manufactured by Mitsubishi Chemical Corp.) | 35 |

TABLE 11-continued

| Material | Parts by mass |
|---|---|
| Roughness-forming particle (Trade name: ART PEARL C-400T, Manufactured by Negami Chemical Industries, Co., Ltd.) | 23 |

3-2. Preparation of Surface Layer-Forming Coating Liquids F-2 to F-46

The surface layer-forming coating liquids F-2 to F-46 were prepared in the same manner as the case for preparing the surface layer formation coating liquid F-1, except that a hydroxyl-terminated prepolymer, an isocyanato group-terminated prepolymer, an additive, carbon black, and roughness forming particles listed in Table 12 below were used.

TABLE 12

| | Hydroxyl group-terminated urethane | | Isocyanato group-terminated urethane | | Additive | | Carbon black | Roughness-forming particle |
|---|---|---|---|---|---|---|---|---|
| | No. | Parts by mass | No. | Parts by mass | No. | Parts by mass | Parts by mass | Parts by mass |
| F-1 | C-1 | 100 | D-5 | 54.7 | E-1 | 7 | 35 | 23 |
| F-2 | C-3 | 100 | D-5 | 54.7 | E-1 | 7 | 35 | 23 |
| F-3 | C-5 | 100 | D-5 | 54.7 | E-1 | 7 | 35 | 23 |
| F-4 | C-7 | 100 | D-5 | 37.2 | E-1 | 6.4 | 32 | 21 |
| F-5 | C-13 | 100 | 0-3 | 54.7 | E-1 | 7 | 35 | 23 |
| F-6 | C-1 | 100 | D-6 | 54.7 | E-1 | 7 | 35 | 23 |
| F-7 | C-7 | 100 | D-4 | 37.2 | E-1 | 6.4 | 32 | 21 |
| F-8 | C-9 | 100 | D-7 | 54.7 | E-1 | 7 | 35 | 23 |
| F-9 | C-1 | 100 | D-1 | 54.7 | E-1 | 7 | 35 | 23 |
| F-10 | C-2 | 100 | D-1 | 54.7 | E-1 | 7 | 35 | 23 |
| F-11 | C-3 | 100 | D-1 | 54.7 | E-1 | 7 | 35 | 23 |
| F-12 | C-4 | 100 | D-1 | 54.7 | E-1 | 7 | 35 | 23 |
| F-13 | C-5 | 100 | D-1 | 54.7 | E-1 | 7 | 35 | 23 |
| F-14 | C-6 | 100 | D-1 | 54.7 | E-1 | 7 | 35 | 23 |
| F-15 | C-7 | 100 | D-1 | 37.2 | E-1 | 6.4 | 32 | 21 |
| F-16 | C-8 | 100 | D-1 | 54.7 | E-1 | 7 | 35 | 23 |
| F-17 | C-9 | 100 | D-1 | 54.7 | E-1 | 7 | 35 | 23 |
| F-18 | C-10 | 100 | D-2 | 54.7 | E-1 | 7 | 35 | 23 |
| F-19 | C-10 | 100 | D-3 | 54.7 | E-1 | 7 | 35 | 23 |
| F-20 | C-11 | 100 | D-5 | 54.7 | E-1 | 7 | 35 | 23 |
| F-21 | C-12 | 100 | D-5 | 54.7 | E-1 | 7 | 35 | 23 |
| F-22 | C-13 | 100 | D-1 | 54.7 | E-1 | 7 | 35 | 23 |
| F-23 | C-10 | 100 | D-4 | 54.7 | E-1 | 7 | 35 | 23 |
| F-24 | C-10 | 100 | D-7 | 54.7 | E-1 | 7 | 35 | 23 |
| F-25 | C-1 | 50 | D-5 | 54.7 | E-1 | 7 | 35 | 23 |
| | C-10 | 50 | | | | | | |
| F-26 | C-14 | 100 | D-1 | 54.7 | E-1 | 7 | 35 | 23 |
| F-27 | C-1 | 100 | D-5 | 54.7 | E-1 | 6.6 | 35 | 23 |
| F-28 | C-1 | 100 | D-5 | 54.7 | E-1 | 16.1 | 35 | 23 |
| F-29 | C-1 | 100 | D-5 | 54.7 | E-2 | 7 | 35 | 23 |
| F-30 | C-1 | 100 | D-5 | 54.7 | E-3 | 7 | 35 | 23 |
| F-31 | C-1 | 100 | D-5 | 54.7 | E-4 | 7 | 35 | 23 |
| F-32 | C-1 | 100 | D-5 | 54.7 | E-5 | 7 | 35 | 23 |
| F-33 | C-1 | 100 | D-5 | 54.7 | E-6 | 7 | 35 | 23 |
| F-34 | C-1 | 100 | D-5 | 54.7 | E-7 | 7 | 35 | 23 |
| F-35 | C-1 | 100 | D-5 | 54.7 | E-8 | 7 | 35 | 23 |
| F-36 | C-1 | 100 | 0-5 | 54.7 | E-8 | 6.6 | 35 | 23 |
| F-37 | C-1 | 100 | D-5 | 54.7 | E-8 | 16.1 | 35 | 23 |
| F-38 | C-1 | 100 | D-5 | 54.7 | E-9 | 7 | 35 | 23 |
| F-39 | C-1 | 100 | D-5 | 54.7 | E-10 | 7 | 35 | 23 |
| F-40 | C-1 | 100 | D-5 | 54.7 | E-11 | 7 | 35 | 23 |
| F-41 | C-1 | 100 | D-5 | 54.7 | E-11 | 6.6 | 35 | 23 |
| F-42 | C-1 | 100 | D-5 | 54.7 | E-11 | 16.1 | 35 | 23 |
| F-43 | C-1 | 100 | D-5 | 54.7 | E-12 | 7 | 35 | 23 |
| F-44 | C-1 | 100 | D-5 | 54.7 | E-13 | 7 | 35 | 23 |
| F-45 | C-15 | 100 | D-10 | 54.7 | E-1 | 7 | 35 | 23 |
| F-46 | C-1 | 100 | D-10 | 54.7 | E-1 | 7 | 35 | 23 |

Example 1

1. Production of Electrophotographic Conductive Roller

Although this example describes an electrophotographic conductive roller in which an elastic roller with an elastic layer provided on the outer surface of a substrate is coated with a surface layer, but the present disclosure is not limited to this configuration.

1-1. Preparation of Substrate

As the substrate, a shaft core, which served as a substrate, was prepared by applying a conductive vulcanized adhesive (trade name: METALOC U-20, manufactured by Toyokagaku Kenkyusho Co., Ltd.) to the peripheral surface of a core metal made of stainless steel (SUS 304) having a diameter of 6.0 mm and a length of 260.0 mm and then firing the adhesive.

1-2. Preparation of Elastic Layer

The materials indicated in Table 13 below were mixed using a 6-liter pressurized kneader (trade name: TD6-15MDX, manufactured by Toshin Co., Ltd.) at a filling rate of 70 vol % and a blade rotation number of 30 rpm for 16 minutes to yield a mixture 1.

TABLE 13

| Material | Parts by mass |
|---|---|
| Acrylonitrile-butadiene rubber (NBR) (Trade name: N230SV, Manufactured by JSR Corp.) | 60 |
| Epichlorohydrin rubber (Trade name: EPION 301, Manufactured by Osaka Soda Co., Ltd.) | 40 |
| Zinc stearate | 1 |
| Zinc oxide | 5 |
| Calcium carbonate (Trade name: NANOX #30, Manufactured by Maruo Calcium Co., Ltd.) | 20 |
| Carbon black (Trade name: TOKABLACK#7400, Manufactured by Tokai Carbon Co., | 40 |

Subsequently, the materials listed in Table 14 were kneaded leftward and rightward a total of 20 times at a front roll rotation speed of 10 rpm, a back roll rotation speed of 8 rpm, and a roll gap of 2 mm using an open roll with a roll diameter of 12 inches (0.30 m). After that, tight milling was performed 10 times at a roll gap of 0.5 mm to yield a mixture 2.

TABLE 14

| Material | Parts by mass |
|---|---|
| Mixture 1 | 200 |
| Sulfur | 1.2 |
| Tetrabenzylthiuram disulfide (Trade name: Nocceler TBzTD, Manufactured by Ouchi Shinko Chemical Industrial Co., Ltd.) | 4.5 |

Next, the mixture 2 was extruded simultaneously with the substrate while being molded into a cylindrical shape coaxially with the substrate as a center by extrusion molding using a cross-head to form a layer of the mixture 2 on the outer peripheral surface of the substrate. An extruder with a cylinder diameter of 45 mm (<D 45) and L/D=20 was used, and the temperatures of the head, cylinder, and screw upon extrusion were each controlled to 90° C. Both ends of the layer of mixture 2 in the longitudinal direction of the substrate were cut, and the length of the layer of the mixture 2 in the longitudinal direction of the substrate was adjusted to 234.2 mm.

After that, the substrate provided with the layer of mixture 2 was heated in an electric furnace at 160° C. for 40 minutes, and the layer of the mixture 2 was vulcanized to form a vulcanized member. Subsequently, the surface of the vulcanized member was polished by a plunge-cut cutting-type grinder to produce an elastic layer roller. The outer diameter of the elastic layer roller was measured using a laser length measuring instrument (trade name: Controller LS-7000, Sensor Head LS-7030R, manufactured by KEYENCE Corporation). The outer diameter was measured at a 10 mm pitch in the longitudinal direction, and the difference between one outer diameter of 10 mm from the end of the elastic layer and the outer diameter at the center of the member was taken as the crown amount. The outer diameter at the end of the resulting elastic layer roller was 11.458 mm, the outer diameter at the center of the elastic layer roller was 11.508 mm, and the crown amount was 50 m.

1-3. Preparation of Surface Layer

For elastic layer rollers, surface modification was performed using an excimer lamp in advance to increase the adhesion to the surface layer.

Next, the elastic layer roller was held at the upper end thereof with the longitudinal direction set to the vertical direction. Then, the elastic layer roller was immersed (dipped) in a surface layer-forming coating liquid F-1 to coat the surface of the elastic layer roller with the coating liquid. The resulting coated matter was air-dried at room temperature for 30 minutes and then dried in a hot air-circulating drier set at 160° C. for 1 hour. As such, an electrophotographic conductive roller G-1 having a surface layer of 12 μm thickness formed on the elastic layer was obtained.

3. Measurement of Surface Potential

The surface potential of the electrophotographic conductive roller was measured using a charge amount measuring apparatus (trade name: DRA-2000L, manufactured by Quality Engineering Associates, Inc.). Specifically, the grid portion of the corona discharger of the charge amount measuring apparatus was placed under an environment of temperature 23° C. and a relative humidity of 50% such that the interval between the grid portion and the outer surface of the electrophotographic conductive roller be 1 mm. Subsequently, a voltage of 8 kV was applied to the corona discharger, and the corona discharger was relatively moved along the axial direction of the electrophotographic conductive roller at a speed of 400 mm/second to charge the outer surface of the electrophotographic conductive roller. At this time, the potential on the outer surface was measured at 0.06 seconds after the passage of the grid.

The potential was measured at a 0.1 mm pitch in the longitudinal direction and a 30-degree pitch in the rotational direction, the potential on the outer surface of the conductive roller was mapped, and the arithmetic mean was taken as the surface potential of the conductive roller.

4. Calculation of Circle-Equivalent Diameter and Inter-Wall Distance of Carbon Black Dispersed in Surface Layer The dispersed particle size and inter-wall distance of the carbon black dispersed in the surface layer were measured by the following method.

First, a slice (with a thickness of 0.5 to 1.0 mm) was cut out using a razor so that a cross-section perpendicular to the longitudinal direction of the electrophotographic conductive roller could be observed. If the adhesiveness between the substrate and the surface layer was high, and it was difficult to cut out the slices with a razor, the entire substrate was cut out with a metal saw or the like, and then cross-sectional processing was performed with a focused ion beam (FIB) apparatus.

The slice was then platinum-deposited, and a scanning electron microscope (SEM) (trade name: JSM-7800F, manufactured by JEOL Ltd.) was used to take images of the surface layer at 15,000× to obtain cross-sectional images.

Furthermore, in order to quantify the cross-sectional image obtained by SEM observation, 8-bit gray scaling was performed on the cross-sectional image using image processing software (trade name: Luzex AP, manufactured by NIRECO Corporation) to obtain a 256-gradation monochrome image. Next, the black and white of the image were inverted so that the carbon black in the cross-sectional image be white. After that, a threshold for binarization was set on the basis of the algorithm of Otsu's discriminant analysis method for the brightness distribution of the image to obtain a binary image in which carbon black was white, and the binder resin portion was black.

Then, the circle-equivalent diameter and the adjacent inter-wall distance of the white carbon black portions in the obtained binary image were calculated using image processing software (trade name: Luzex AP, manufactured by NIRECO Corporation). The image region for calculating the circle-equivalent diameter and inter-wall distance was set to a region inside 0.075 m (If there was a text section describing SEM measurement conditions or the like, 0.075 m inside from the part where the actual image started) in the actual image dimensions to eliminate uncertainty in the calculated values of carbon black that was divided at the top, bottom, left and right edges of the image. Then, a circle-equivalent diameter and an adjacent inter-wall distance for all carbon blacks in the designated image region were calculated. Then, an arithmetic mean and a standard deviation were calculated for the distribution of the obtained circle-equivalent diameter and the adjacent inter-wall distance.

For the number of images to be analyzed, the surface layer of the electrophotographic conductive roller was divided into five equal portions in the longitudinal direction and cut out slices one by one from each portion in order to eliminate the influence of the difference in locations in the longitudinal direction of the carbon black dispersed in the surface layer of the electrophotographic conductive roller. At this time, the portion where the slices were cut out was set to the center in the longitudinal direction for each of the surface layers divided into five equal portions in the longitudinal direction. Then, images were taken one by one for one slice, and a total of five images were taken and the arithmetic mean of the values obtained from these five images was used as the value of the conductive roller.

5. Evaluation of Images

The method for evaluating images will be described below.

Figure 5:
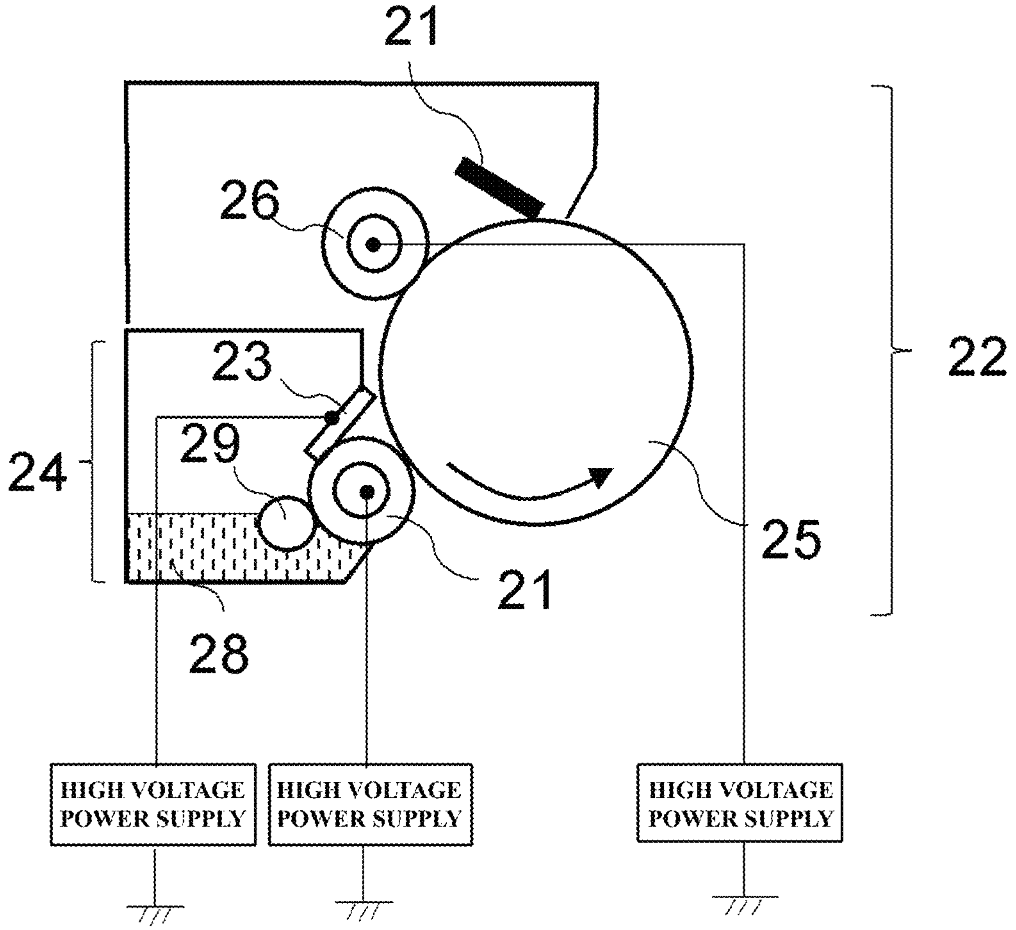
FIG. 5 is a schematic view of an electrophotographic image forming apparatus for image evaluation.

As the electrophotographic image forming apparatus, a remodeling machine of a commercially available laser printer, LBP-7600C (manufactured by Canon Inc.) was used. FIG. 5 illustrates the construction of the remodeling machine. The machine was modified so as to be connected to an external high-voltage power source and to provide an arbitrary potential difference between the developing blade and the electrophotographic conductive roller, and the number of output sheets per unit time was set to 50 sheets/min for A4 size paper sheets for evaluation in high-speed processes.

As the process cartridge, a commercially available toner cartridge 318 (black) (manufactured by Canon Inc.) was used, and the developing roller was replaced with the electrophotographic conductive roller G-1. At this time, the filling amount of the toner was adjusted to 100 g. Yellow, cyan, and magenta cartridges were inserted into the yellow, cyan, and magenta stations, respectively, with the product toner removed and the remaining toner detection mechanism disabled, and the evaluation was conducted.

5-1. Evaluation of Fogging

The prepared process cartridge was fitted to the main body of an electrophotographic image forming apparatus and allowed to stand in an environment at a temperature of 30° C. and a relative humidity of 80% for 24 hours. The potential difference between the developing blade and the electrophotographic conductive roller was then set to −300 V using an external high-voltage power source. In the same environment, images of the letter "E" of the alphabet with a size of 4 points were output in a series of images with a print percentage of 2% for an area of an A4 size paper sheet on A4 evaluation paper sheets (GF-C081, manufactured by Canon Inc.). A solid white image was output every 1000 sheets of output, and this was repeated up to 20000 sheets, and the fogging values were measured in the following manner.

The reflection density R1 of the recording material before image formation and the reflection density R2 of the recording material on which the solid white image was output were measured using a reflection density meter (trade name: TC-6DS/A manufactured by Tokyo Denshoku Gijutsu Center Ltd.), and the increase in the reflection density (R2−R1) was set to the "fogging value" of the electrophotographic conductive roller. The reflection density was measured over the entire region of the image-printed region of the recording material, and the arithmetical average value was adopted for the recording material before image formation, and the maximum value was adopted for the recording material on which a solid white image was output. Next, an arithmetic average of the fogging values of up to 20000 images was calculated. Note that the smaller the fogging value, the better, and usually, the toner is not transferred onto the transfer paper on which a solid white image is formed. If the amount of charge of the toner is insufficient, the toner moves onto the photoreceptor even during the formation of a solid white image and is further transferred onto the transfer paper sheet to increase the fogging value. Tables 16-1 and 16-2 show the evaluation results.

Because fogging tended to occur easily in high-temperature and high-humidity environments at a temperature of 30° C. and a relative humidity of 80%, the evaluation was carried out in the above environment.

5-2. Evaluation of Image Density Stability

The prepared process cartridge was fitted to the main body of the electrophotographic image forming apparatus and allowed to stand for 24 hours under an environment at a temperature of 23° C. and a relative humidity of 50%. After that, the potential difference between the developing blade and the electrophotographic conductive roller was set to −300 V by using an external high voltage power source, and one half-tone image of 25% relative to solid black, 48 solid white images, and one halftone image of 25% relative to solid black were output in series in this order. The densities of the first and fiftieth half-tone images obtained were measured using a spectrophotometer (trade name: 508, manufactured by X-Rite, Inc.) to determine the density difference between the first and fiftieth sheets. Note that the smaller the density difference, the better. Tables 16-1 and 16-2 show the evaluation results.

Examples 2 to 46

In Examples 2 to 46, the electrophotographic conductive rollers G-2 to G-46 were prepared in the same manner as in Example 1, except that the surface layer-forming coating liquids (F-2 to F-46) listed in Tables 15-1 and 15-2 were used instead, and then each measurement and evaluation were performed in the same manner as in example 1. Tables 16-1 and 16-2 show the evaluation results.

TABLE 15-1

| | Conductive | Surface layer-forming coating | Binder resin structure Structure ① | | | |
|---|---|---|---|---|---|---|
| Examples | roller No. | liquid No. | Formula | | | |
| 1 | G-1 | F-1 | (1) | R11═$(CH_2)_5$ | R12═$(CH_2)_6$ | m, n = 6.9 |
| 2 | G-2 | F-2 | (1) | R11═$(CH_2)_3$ | R12═$(CH_2)_4$ | m, n = 8.8 |
| 3 | G-3 | F-3 | (1) | R11═$(CH_2)_6$ | R12═$(CH_2)_2$—CHMe—$(CH_2)_2$ | m, n = 6.5 |
| 4 | G-4 | F-4 | (1) | R11═$(CH_2)_6$ | R12═$(CH_2)_2$—CHMe—$(CH_2)_2$ | m = 2.0, n = 18.0 |
| 5 | G-5 | F-5 | (4) | | R41═$(CH_2)_6$ | s = 13.2 |
| 6 | G-6 | F-6 | (1) | R11═$(CH_2)_5$ | R12═$(CH_2)_6$ | m, n = 6.9 |
| 7 | G-7 | F-7 | (1) | R11═$(CH_2)_6$ | R12═$(CH_2)_2$—CHMe—$(CH_2)_2$ | m = 2.0, n = 18.0 |
| 8 | G-8 | F-8 | (1) | R11═$(CH_2)_9$ | R12═$CH_2$—CHMe—$(CH_2)_6$ | m = 3.5, n = 6.5 |
| 9 | G-9 | F-9 | (1) | R11═$(CH_2)_5$ | R12═$(CH_2)_6$ | m, n = 6.9 |
| 10 | G-10 | F-10 | (1) | R11═$(CH_2)_4$ | R12═$(CH_2)_6$ | m = 10.7, n = 4.6 |
| 11 | G-11 | F-11 | (1) | R11═$(CH_2)_3$ | R12═$(CH_2)_4$ | m, n = 8.8 |
| 12 | G-12 | F-12 | (1) | R11═$(CH_2)_4$ | R12═$(CH_2)_6$ | m = 14.5, n = 1.6 |
| 13 | G-13 | F-13 | (1) | R11═$(CH_2)_6$ | R12═$(CH_2)_2$—CHMe—$(CH_2)_2$ | m, n = 6.5 |
| 14 | G-14 | F-14 | (1) | R11═$(CH_2)_6$ | R12═$(CH_2)_2$—CHMe—$(CH_2)_2$ | m = 1.3, n = 11.8 |
| 15 | G-15 | F-15 | (1) | R11═$(CH_2)_6$ | R12═$(CH_2)_2$—CHMe—$(CH_2)_2$ | m = 2.0, n = 18.0 |
| 16 | G-16 | F-16 | (1) | R11═$(CH_2)_9$ | R12═$CH_2$—CHMe—$(CH_2)_6$ | m = 6.5, n = 3.5 |
| 17 | G-17 | F-17 | (1) | R11═$(CH_2)_9$ | R12═$CH_2$—CHMe—$(CH_2)_6$ | m = 3.5, n = 6.5 |
| 18 | G-18 | F-18 | (2) | | o = 9.1, p = 5.5 | |
| 19 | G-19 | F-19 | (2) | | o = 9.1, p = 5.5 | |
| 20 | G-20 | F-20 | (3) | R31═$(CH_2)_3$ | R32═$(CH_2)_4$ | q = 12, r = 5.1 |
| 21 | G-21 | F-21 | (3) | R31═$(CH_2)_6$ | R32═$(CH_2)_8$ | q = 2.7, r = 6.3 |
| 22 | G-22 | F-22 | (4) | | R41═$(CH_2)_6$ | s = 13.2 |
| 23 | G-23 | F-23 | (2) | | o = 9.1, p = 5.5 | |
| 24 | G-24 | F-24 | (2) | | o = 9.1, p = 5.5 | |
| 25 | G-25 | F-25 | (1) | R11═$(CH_2)_5$ | R12═$(CH_2)_6$ | m, n = 6.9 |
| | | | (2) | | o = 9.1, p = 5.5 | |
| 26 | G-26 | F-26 | (1) | R11═$(CH_2)_5$ | R12═$(CH_2)_6$ | m, n = 6.9 |
| 27 | G-27 | F-27 | (1) | R11═$(CH_2)_5$ | R12═$(CH_2)_6$ | m, n = 6.9 |
| 28 | G-28 | F-28 | (1) | R11═$(CH_2)_5$ | R12═$(CH_2)_6$ | m, n = 6.9 |
| 29 | G-29 | F-29 | (1) | R11═$(CH_2)_5$ | R12═$(CH_2)_6$ | m, n = 6.9 |
| 30 | G-30 | F-30 | (1) | R11═$(CH_2)_5$ | R12═$(CH_2)_6$ | m, n = 6.9 |
| 31 | G-31 | F-31 | (1) | R11═$(CH_2)_5$ | R12═$(CH_2)_6$ | m, n = 6.9 |
| 32 | G-32 | F-32 | (1) | R11═$(CH_2)_5$ | R12═$(CH_2)_6$ | m, n = 6.9 |
| 33 | G-33 | F-33 | (1) | R11═$(CH_2)_5$ | R12═$(CH_2)_6$ | m, n = 6.9 |
| 34 | G-34 | F-34 | (1) | R11═$(CH_2)_5$ | R12═$(CH_2)_6$ | m, n = 6.9 |
| 35 | G-35 | F-35 | (1) | R11═$(CH_2)_5$ | R12═$(CH_2)_6$ | m, n = 6.9 |
| 36 | G-36 | F-36 | (1) | R11═$(CH_2)_5$ | R12═$(CH_2)_6$ | m, n = 6.9 |
| 37 | G-37 | F-37 | (1) | R11═$(CH_2)_5$ | R12═$(CH_2)_6$ | m, n = 6.9 |
| 38 | G-38 | F-38 | (1) | R11═$(CH_2)_5$ | R12═$(CH_2)_6$ | m, n = 6.9 |
| 39 | G-39 | F-39 | (1) | R11═$(CH_2)_5$ | R12═$(CH_2)_6$ | m, n = 6.9 |
| 40 | G-40 | F-40 | (1) | R11═$(CH_2)_5$ | R12═$(CH_2)_6$ | m, n = 6.9 |
| 41 | G-41 | F-41 | (1) | R11═$(CH_2)_5$ | R12═$(CH_2)_6$ | m, n = 6.9 |
| 42 | G-42 | F-42 | (1) | R11═$(CH_2)_5$ | R12═$(CH_2)_6$ | m, n = 6.9 |
| 43 | G-43 | F-43 | (1) | R11═$(CH_2)_5$ | R12═$(CH_2)_6$ | m, n = 6.9 |
| 44 | G-44 | F-44 | (1) | R11═$(CH_2)_5$ | R12═$(CH_2)_6$ | m, n = 6.9 |
| 45 | G-45 | F-45 | | Not containing the structures of formulas (1) to (4) | | |
| 46 | G-46 | F-46 | (1) | R11═$(CH_2)_5$ | R12═$(CH_2)_6$ | m, n = 6.9 |

TABLE 15-2

| | Binder resin structure Structure (2) | | | Additive structure | | |
|---|---|---|---|---|---|---|
| Examples | Formula | | | Formula | | |
| 1 | (4) | $R41{=}(CH_2)_6$ | s = 13.2 | (5) | $R51{=}C_4H_9$ | t, u = 17 |
| 2 | (4) | $R41{=}(CH_2)_6$ | s = 13.2 | (5) | $R51{=}C_4H_9$ | t, u = 17 |
| 3 | (4) | $R41{=}(CH_2)_6$ | s = 13.2 | (5) | $R51{=}C_4H_9$ | t, u = 17 |
| 4 | (4) | $R41{=}(CH_2)_6$ | s = 13.2 | (5) | $R51{=}C_4H_9$ | t, u = 17 |
| 5 | (1) | $R41{=}(CH_2)_6$ $R12{=}CH_2{-}CH{<}^{(CH_2)_2}_{(CH_2)_2}{>}CH{-}CH_2$ | m = 4.1, n = 1.4 | (5) | $R51{=}C_4H_9$ | t, u = 17 |
| 6 | (4) | $R41{=}(CH_2)_6$ | s = 20.1 | (5) | $R51{=}C_4H_9$ | t, u = 17 |
| 7 | (4) | $R41{=}CH_2{-}CH{<}^{(CH_2)_2}_{(CH_2)_2}{>}CH{-}CH_2$ | s = 5.8 | (5) | $R51{=}C_4H_9$ | t, u = 17 |
| 8 | (4) | $R41{=}CH_2{-}CEtBu{-}CH_2$ | s = 4.6 | (5) | $R51{=}C_4H_9$ | t, u = 17 |
| 9 | (2) | o = 9.1, p = 5.5 | | (5) | $R51{=}C_4H_9$ | t, u = 17 |
| 10 | (2) | o = 9.1, p = 5.5 | | (5) | $R51{=}C_4H_9$ | t, u = 17 |
| 11 | (2) | o = 9.1, p = 5.5 | | (5) | $R51{=}C_4H_9$ | t, u = 17 |
| 12 | (2) | o = 9.1, p = 5.5 | | (5) | $R51{=}C_4H_9$ | t, u = 17 |
| 13 | (2) | o = 9.1, p = 5.5 | | (5) | $R51{=}C_4H_9$ | t, u = 17 |
| 14 | (2) | o = 9.1, p = 5.5 | | (5) | $R51{=}C_4H_9$ | t, u = 17 |
| 15 | (2) | o = 9.1, p = 5.5 | | (5) | $R51{=}C_4H_9$ | t, u = 17 |
| 16 | (2) | o = 9.1, p = 5.5 | | (5) | $R51{=}C_4H_9$ | t, u = 17 |
| 17 | (2) | o = 9.1, p = 5.5 | | (5) | $R51{=}C_4H_9$ | t, u = 17 |
| 18 | (1) | $R11{=}(CH_2)_6$ $R12{=}CH_2{-}CH{<}^{(CH_2)_2}_{(CH_2)_2}{>}CH{-}CH_2$ | m, n = 2.7 | (5) | $R51{=}C_4H_9$ | t, u = 17 |
| 19 | (1) | $R11{=}(CH_2)_6$ $R12{=}CH_2{-}CH{<}^{(CH_2)_2}_{(CH_2)_2}{>}CH{-}CH_2$ | m = 4.1, n = 1.4 | (5) | $R51{=}C_4H_9$ | t, u = 17 |
| 20 | (4) | $R41{=}(CH_2)_6$ | s = 13.2 | (5) | $R51{=}C_4H_9$ | t, u = 17 |
| 21 | (4) | $R41{=}(CH_2)_6$ | s = 13.2 | (5) | $R51{=}C_4H_9$ | t, u = 17 |
| 22 | (2) | o = 9.1, p = 5.5 | | (5) | $R51{=}C_4H_9$ | t, u = 17 |
| 23 | (4) | $R41{=}CH_2{-}CH{<}^{(CH_2)_2}_{(CH_2)_2}{>}CH{-}CH_2$ | s = 5.8 | (5) | $R51{=}C_4H_9$ | t, u = 17 |
| 24 | (4) | $R41{=}CH_2{-}CEtBu{-}CH_2$ | s = 4.6 | (5) | $R51{=}C_4H_9$ | t, u = 17 |
| 25 | (4) | $R41{=}(CH_2)_6$ | s = 13.2 | (5) | $R51{=}C_4H_9$ | t, u = 17 |
| 26 | (2) | o = 9.1, p = 5.5 | | (5) | $R51{=}C_4H_9$ | t, u = 17 |
| 27 | (4) | $R41{=}(CH_2)_6$ | s = 13.2 | (5) | $R51{=}C_4H_9$ | t, u = 17 |
| 28 | (4) | $R41{=}(CH_2)_6$ | s = 13.2 | (5) | $R51{=}C_4H_9$ | t, u = 17 |
| 29 | (4) | $R41{=}(CH_2)_6$ | s = 13.2 | (5) | $R51{=}C_4H_9$ | t, u = 30 |
| 30 | (4) | $R41{=}(CH_2)_6$ | s = 13.2 | (5) | $R51{=}C_4H_9$ | t = 9 u = 10 |
| 31 | (4) | $R41{=}(CH_2)_6$ | s = 13.2 | (5) | $R51{=}C_{12}H_{25}$ | t, u = 5 |
| 32 | (4) | $R41{=}(CH_2)_6$ | s = 13.2 | (5) | $R51{=}C_{12}H_{25}$ | t, u = 25 |
| 33 | (4) | $R41{=}(CH_2)_6$ | s = 13.2 | (5) | $R51{=}C_8H_{17}$ | t, u = 15 |
| 34 | (4) | $R41{=}(CH_2)_6$ | s = 13.2 | (5) | $R51{=}CH_3$ | t, u = 12 |
| 35 | (4) | $R41{=}(CH_2)_6$ | s = 13.2 | (6) | $R61{=}CH_3$ | v = 6, w = 29 |
| 36 | (4) | $R41{=}(CH_2)_6$ | s = 13.2 | (6) | $R61{=}CH_3$ | v = 6, w = 29 |
| 37 | (4) | $R41{=}(CH_2)_6$ | s = 13.2 | (6) | $R61{=}CH_3$ | v = 6, w = 29 |
| 38 | (4) | $R41{=}(CH_2)_6$ | s = 13.2 | (6) | $R61{=}CH_3$ | v = 1, w = 9 |
| 39 | (4) | $R41{=}(CH_2)_6$ | s = 13.2 | (6) | $R61{=}C_8H_{17}$ | v, w = 15 |
| 40 | (4) | $R41{=}(CH_2)_6$ | s = 13.2 | (7) | $R71{=}C_{12}H_{25}$ | x = 5 |
| 41 | (4) | $R41{=}(CH_2)_6$ | s = 13.2 | (7) | $R71{=}C_{12}H_{25}$ | x = 5 |
| 42 | (4) | $R41{=}(CH_2)_6$ | s = 13.2 | (7) | $R71{=}C_{12}H_{25}$ | x = 5 |
| 43 | (4) | $R41{=}(CH_2)_6$ | s = 13.2 | (7) | $R71{=}CH_3$ | x = 11 |
| 44 | (4) | $R41{=}(CH_2)_6$ | s = 13.2 | (7) | $R71{=}C_8H_{17}$ | x = 14 |
| 45 | | Not containing the structures of formulas (1) to (4) | | (5) | $R51{=}C_4H_9$ | t, u = 17 |
| 46 | | — | | (5) | $R51{=}C_4H_9$ | t, u = 17 |

TABLE 16-1

| Examples | Conductive roller No. | Carbon black property: Primary particle size [nm] | Carbon black property: DBP absorption amount [ml/100 g] | Carbon black property: pH | Parts | Surface potential [V] |
|---|---|---|---|---|---|---|
| 1 | G-1 | 24 | 51 | 2.5 | 35 | 4.7 |
| 2 | G-2 | 24 | 51 | 2.5 | 35 | 10.3 |
| 3 | G-3 | 24 | 51 | 2.5 | 35 | 4.5 |
| 4 | G-4 | 24 | 51 | 2.5 | 32 | 5.1 |
| 5 | G-5 | 24 | 51 | 2.5 | 35 | 11.6 |
| 6 | G-6 | 24 | 51 | 2.5 | 35 | 6.6 |
| 7 | G-7 | 24 | 51 | 2.5 | 32 | 10.8 |
| 8 | G-8 | 24 | 51 | 2.5 | 35 | 8.6 |
| 9 | G-9 | 24 | 51 | 2.5 | 35 | 2.6 |
| 10 | G-10 | 24 | 51 | 2.5 | 35 | 2.3 |
| 11 | G-11 | 24 | 51 | 2.5 | 35 | 2.6 |
| 12 | G-12 | 24 | 51 | 2.5 | 35 | 3.7 |
| 13 | G-13 | 24 | 51 | 2.5 | 35 | 3.4 |
| 14 | G-14 | 24 | 51 | 2.5 | 35 | 3.0 |
| 15 | G-15 | 24 | 51 | 2.5 | 32 | 4.2 |
| 16 | G-16 | 24 | 51 | 2.5 | 35 | 3.9 |
| 17 | G-17 | 24 | 51 | 2.5 | 35 | 3.2 |
| 18 | G-18 | 24 | 51 | 2.5 | 35 | 2.1 |
| 19 | G-19 | 24 | 51 | 2.5 | 35 | 2.5 |
| 20 | G-20 | 24 | 51 | 2.5 | 35 | 2.9 |
| 21 | G-21 | 24 | 51 | 2.5 | 35 | 3.1 |
| 22 | G-22 | 24 | 51 | 2.5 | 35 | 2.6 |
| 23 | G-23 | 24 | 51 | 2.5 | 35 | 2.4 |
| 24 | G-24 | 24 | 51 | 2.5 | 35 | 3.0 |

TABLE 16-1-continued

| Examples | Conductive roller No. | Carbon black property: Primary particle size [nm] | Carbon black property: DBP absorption amount [ml/100 g] | Carbon black property: pH | Parts | Surface potential [V] |
|---|---|---|---|---|---|---|
| 25 | G-25 | 24 | 51 | 2.5 | 35 | 3.7 |
| 26 | G-26 | 24 | 51 | 2.5 | 35 | 2.9 |
| 27 | G-27 | 24 | 51 | 2.5 | 35 | 3.7 |
| 28 | G-28 | 24 | 51 | 2.5 | 35 | 5.9 |
| 29 | G-29 | 24 | 51 | 2.5 | 35 | 5.6 |
| 30 | G-30 | 24 | 51 | 2.5 | 35 | 5.3 |
| 31 | G-31 | 24 | 51 | 2.5 | 35 | 4.8 |
| 32 | G-32 | 24 | 51 | 2.5 | 35 | 4.7 |
| 33 | G-33 | 24 | 51 | 2.5 | 35 | 5.7 |
| 34 | G-34 | 24 | 51 | 2.5 | 35 | 5.2 |
| 35 | G-35 | 24 | 51 | 2.5 | 35 | 4.2 |
| 36 | G-36 | 24 | 51 | 2.5 | 35 | 4.3 |
| 37 | G-37 | 24 | 51 | 2.5 | 35 | 4.0 |
| 38 | G-38 | 24 | 51 | 2.5 | 35 | 3.2 |
| 39 | G-39 | 24 | 51 | 2.5 | 35 | 3.9 |
| 40 | G-40 | 24 | 51 | 2.5 | 35 | 3.7 |
| 41 | G-41 | 24 | 51 | 2.5 | 35 | 3.1 |
| 42 | G-42 | 24 | 51 | 2.5 | 35 | 3.4 |
| 43 | G-43 | 24 | 51 | 2.5 | 35 | 3.1 |
| 44 | G-44 | 24 | 51 | 2.5 | 35 | 3.1 |
| 45 | G-45 | 24 | 51 | 2.5 | 35 | 3.1 |
| 46 | G-46 | 24 | 51 | 2.5 | 35 | 3.1 |

TABLE 16-2

| | Carbon black dispersed state | | | | | | | |
|---|---|---|---|---|---|---|---|---|
| | Dispersed circle-equivalent diameter | | | Inter-wall distance | | | | |
| Examples | Average Rc [nm] | Standard deviation σc [nm] | σc/Rc | Average d [nm] | Standard deviation σd [nm] | σd/d | Fogging evaluation | Image density stability |
| 1 | 54.2 | 31.6 | 0.583 | 113.8 | 65.4 | 0.575 | 0.8 | 0.05 |
| 2 | 53.1 | 31.0 | 0.584 | 111.1 | 63.3 | 0.570 | 1.6 | 0.04 |
| 3 | 48.5 | 27.8 | 0.573 | 100.2 | 55.9 | 0.558 | 1.0 | 0.01 |
| 4 | 49.6 | 28.1 | 0.567 | 94.5 | 56.3 | 0.596 | 1.1 | 0.03 |
| 5 | 49.5 | 29.5 | 0.596 | 104.3 | 58.3 | 0.559 | 1.5 | 0.04 |
| 6 | 50.6 | 29.3 | 0.579 | 105.6 | 59.0 | 0.559 | 1.0 | 0.05 |
| 7 | 48.7 | 29.6 | 0.608 | 103.5 | 59.4 | 0.574 | 1.8 | 0.03 |
| 8 | 48.4 | 28.6 | 0.591 | 103.8 | 59.1 | 0.569 | 1.1 | 0.04 |
| 9 | 51.6 | 30.2 | 0.585 | 102.7 | 58.0 | 0.565 | 2.1 | 0.10 |
| 10 | 50.4 | 30.5 | 0.605 | 104.3 | 58.8 | 0.564 | 2.2 | 0.09 |
| 11 | 56.2 | 36.1 | 0.642 | 105.9 | 58.3 | 0.551 | 2.0 | 0.12 |
| 12 | 54.2 | 33.2 | 0.613 | 106.4 | 59.2 | 0.556 | 1.8 | 0.08 |
| 13 | 50.4 | 30.4 | 0.603 | 107.7 | 59.1 | 0.549 | 2.2 | 0.07 |
| 14 | 52.3 | 30.6 | 0.585 | 108.6 | 61.4 | 0.565 | 2.1 | 0.08 |
| 15 | 51.5 | 30.6 | 0.594 | 108.2 | 61.1 | 0.565 | 2.5 | 0.09 |
| 16 | 48.8 | 28.6 | 0.586 | 107.9 | 61.4 | 0.569 | 2.3 | 0.07 |
| 17 | 49.6 | 30.8 | 0.621 | 105.6 | 61.4 | 0.581 | 2.1 | 0.07 |
| 18 | 55.2 | 32.4 | 0.587 | 108.9 | 62.2 | 0.571 | 1.8 | 0.09 |
| 19 | 54.2 | 33.4 | 0.616 | 109.8 | 62.4 | 0.568 | 1.9 | 0.09 |
| 20 | 55.1 | 33.0 | 0.599 | 108.6 | 62.1 | 0.572 | 1.8 | 0.10 |
| 21 | 56.1 | 33.2 | 0.592 | 107.0 | 62.3 | 0.582 | 1.9 | 0.10 |
| 22 | 55.3 | 33.5 | 0.606 | 107.9 | 62.1 | 0.576 | 1.8 | 0.10 |
| 23 | 53.3 | 33.4 | 0.627 | 108.9 | 62.1 | 0.570 | 1.9 | 0.09 |
| 24 | 54.4 | 33.6 | 0.618 | 105.6 | 60.0 | 0.568 | 1.0 | 0.08 |
| 25 | 51.6 | 32.4 | 0.628 | 104.8 | 59.3 | 0.566 | 1.8 | 0.05 |
| 26 | 50.4 | 31.6 | 0.627 | 102.2 | 58.8 | 0.575 | 0.6 | 0.09 |
| 27 | 54.5 | 32.8 | 0.602 | 101.8 | 57.7 | 0.567 | 0.8 | 0.04 |
| 28 | 53.3 | 32.5 | 0.610 | 103.2 | 58.1 | 0.563 | 1.6 | 0.05 |
| 29 | 54.3 | 32.3 | 0.595 | 105.6 | 59.3 | 0.562 | 1.3 | 0.04 |
| 30 | 54.2 | 33.2 | 0.613 | 100.7 | 57.8 | 0.574 | 1.2 | 0.05 |
| 31 | 53.4 | 32.8 | 0.614 | 103.7 | 58.2 | 0.561 | 1.2 | 0.04 |
| 32 | 52.4 | 32.5 | 0.620 | 104.4 | 59.2 | 0.567 | 1.0 | 0.04 |
| 33 | 53.9 | 32.1 | 0.596 | 102.8 | 58.5 | 0.569 | 1.4 | 0.05 |
| 34 | 54.3 | 33.3 | 0.613 | 102.7 | 58.0 | 0.565 | 1.2 | 0.05 |
| 35 | 52.3 | 30.4 | 0.581 | 104.3 | 58.5 | 0.561 | 1.0 | 0.04 |

TABLE 16-2-continued

| | Carbon black dispersed state | | | | | | | |
|---|---|---|---|---|---|---|---|---|
| | Dispersed circle-equivalent diameter | | | Inter-wall distance | | | | |
| Examples | Average Rc [nm] | Standard deviation σc [nm] | σc/Rc | Average d [nm] | Standard deviation σd [nm] | σd/d | Fogging evaluation | Image density stability |
| 36 | 52.3 | 31.4 | 0.600 | 105.9 | 58.0 | 0.548 | 0.9 | 0.05 |
| 37 | 53.3 | 32.1 | 0.602 | 106.7 | 58.4 | 0.547 | 0.9 | 0.07 |
| 38 | 52.9 | 31.8 | 0.601 | 107.8 | 62.2 | 0.577 | 0.9 | 0.05 |
| 39 | 55.3 | 33.4 | 0.604 | 116.9 | 68.7 | 0.588 | 1.1 | 0.09 |
| 40 | 56.1 | 36.0 | 0.642 | 132.9 | 79.2 | 0.596 | 1.2 | 0.09 |
| 41 | 55.3 | 35.2 | 0.637 | 138.3 | 80.5 | 0.582 | 0.8 | 0.10 |
| 42 | 55.4 | 35.3 | 0.637 | 140.6 | 79.8 | 0.568 | 1.0 | 0.09 |
| 43 | 56.0 | 35.2 | 0.629 | 146.4 | 84.9 | 0.580 | 0.7 | 0.10 |
| 44 | 55.0 | 35.3 | 0.642 | 130.1 | 75.6 | 0.581 | 0.9 | 0.10 |
| 45 | 48.2 | 27.3 | 0.566 | 91.2 | 55.2 | 0.605 | 2.8 | 0.10 |
| 46 | 51.2 | 32.2 | 0.629 | 98.2 | 56.2 | 0.572 | 2.2 | 0.10 |

Comparative Examples 1 and 2

The surface layer-forming coating liquids F-47 and F-48 and the electrophotographic conductive rollers G-47 and G-48 were prepared and evaluated in the same manner as in Example 1, except that the carbon black used in the surface layer-forming coating liquid F-1 was changed to the material listed in Table 17 below. Table 20 shows the evaluation results.

TABLE 17

| | | | Carbon black material | | | |
|---|---|---|---|---|---|---|
| | Conductive roller No. | Surface layer-forming coating liquid No. | Material name | Primary particle size [nm] | DBP absorption amount [ml/100 g] | pH |
| Example 1 | G-1 | F-1 | MA8 (Manufactured by Mitsubishi Chemical Corp.) | 24 | 51 | 2.5 |
| Comparative Example 1 | G-47 | F-47 | MA230 (Manufactured by Mitsubishi Chemical Corp.) | 30 | 113 | 3 |
| Comparative Example 2 | G-48 | F-48 | MA14 (Manufactured by Mitsubishi Chemical Corp.) | 40 | 73 | 3 |

Comparative Examples 3 and 4

The surface layer-forming coating liquids F-49 and F-50 and the electrophotographic conductive rollers G-49 and G-50 were prepared and evaluated in the same manner as in Example 1, except that the additives used in the surface layer-forming coating liquid F-1 were changed to the materials listed in Table 18 below. Table 20 shows the evaluation results.

TABLE 18

| | | Surface layer-forming | Additive | |
|---|---|---|---|---|
| | Conductive roller No. | coating liquid No. | Material | Parts by mass |
| Example 1 | G-1 | F-1 | E-1 | 7 |
| Comparative Example 3 | G-49 | F-49 | None | 0 |
| Comparative Example 4 | G-50 | F-50 | Polymer-based dispersing agent (Trade name: Disper byk-185, Manufactured by BYK-Chemie GMBH) | 7 |

Comparative Examples 5 and 6

The surface layer-forming coating liquids F-51 and F-52 and the electrophotographic conductive rollers G-51 and G-52 were prepared and evaluated in the same manner as in Example 45, except that the additives used in the surface layer-forming coating liquid F-45 were changed to the material listed in Table 19 below. Table 20 shows the evaluation results.

TABLE 19

| | Conductive roller No. | Surface layer-forming coating liquid No. | Additive | |
|---|---|---|---|---|
| | | | Material | Parts by mass |
| Example 1 | G-45 | F-45 | E-1 | 7 |
| Comparative Example 5 | G-51 | F-51 | None | 0 |
| Comparative Example 6 | G-52 | F-52 | Polymer-based dispersing agent (Trade name: Disper byk-185, Manufactured by BYK-Chemie GMBH) | 7 |

TABLE 20

| | | Carbon black property | | | | | Carbon black dispersed state | | | | | | | |
|---|---|---|---|---|---|---|---|---|---|---|---|---|---|---|
| | | | | | | | Dispersed circle-equivalent | | | Inter-wall distance | | | | |
| Comparative Examples | Electrophotographic roller No. | Primary particle size [nm] | DBP absorption amount [ml/100 g] | pH | Parts | Surface potential [V] | Average Rc [nm] | Standard deviation σc [nm] | σc/Rc | Average d [nm] | Standard deviation σd [nm] | σd/d | Fogging evaluation | Image density stability |
| 1 | G-48 | 30 | 113 | 3 | 35 | 2.4 | 88.2 | 56.0 | 0.635 | 152.5 | 92.1 | 0.604 | 3.1 | 0.18 |
| 2 | G-49 | 40 | 73 | 3 | 35 | 20.2 | 103.2 | 80.2 | 0.777 | 225.2 | 130.7 | 0.580 | 6.0 | 0.22 |
| 3 | G-50 | 24 | 51 | 2.5 | 35 | 12.2 | 111.5 | 91.2 | 0.818 | 200.2 | 125.85 | 0.629 | 4.8 | 0.25 |
| 4 | G-51 | 24 | 51 | 2.5 | 35 | 10.8 | 87.8 | 55.5 | 0.632 | 175.2 | 115.2 | 0.658 | 3.7 | 0.18 |
| 5 | G-52 | 24 | 51 | 2.5 | 35 | 4.2 | 81.2 | 60.2 | 0.741 | 180.2 | 105.8 | 0.587 | 6.7 | 0.16 |
| 6 | G-53 | 24 | 51 | 2.5 | 35 | 5.2 | 61.2 | 45.2 | 0.739 | 160.8 | 100.1 | 0.623 | 5.2 | 0.16 |

Examples 1 to 46 show good or nearly good results in fogging evaluation and image density stability evaluation. In particular, when having a polycarbonate structure as in Examples 1 to 44, the fogging and density stability were superior to those of Examples 45 and 46, which did not have a polycarbonate structure. It is believed that the binder also contributes to charge leakage at a certain rate.

Also, among Examples 1 to 44, good results were obtained when a polyurethane of a combination of the structure represented by formula (1) and the structure represented by formula (4) was used. An ester structure exists in the structure represented by formula (2) and in the structure represented by formula (3). It is believed that since the ester structure is more electrically conductive than the polycarbonate structure, a combination of the structure represented by formula (1) and the structure represented by formula (4) having the polycarbonate structure exhibited better results.

The presence of a side-chain hydrocarbon group in R12 in formula (1) and R41 in formula (4) shows a favorable trend. Although not known in detail, it is inferred that the interaction of the hydrocarbon groups in the side chains in the polyurethane structure with carbon black, which exhibits hydrophobic properties, increases the dispersibility of the carbon black, which shows good results.

In contrast, the fogging evaluation and image density stability evaluation were not good in Comparative Examples 1 to 6 in a configuration with fast process speed and high blade bias. The arithmetic mean of the circle-equivalent diameter was large, and the arithmetic mean of the inter-wall distances was also large in Comparative Examples 1 and 2. Thus, the evaluation results of Comparative Examples 1 and 2 were not so good.

Comparative Examples 3 and 4 are examples in which the amount and type of additives were changed from example 1. The dispersion state of carbon black was not a targeted value, and the evaluation of fogging and image density stability was not good. The roller surface potential also tended to be high due to the uneven dispersion of carbon black, confirming the importance of achieving an appropriate dispersion state.

Comparative Examples 5 and 6 are examples in which the amount and type of additive were changed from example 45. Since the dispersion state of carbon black was bad, the evaluation of fogging and image density stability were not so good.

While the present invention has been described with reference to exemplary embodiments, it is to be understood that the invention is not limited to the disclosed exemplary embodiments. The scope of the following claims is to be accorded the broadest interpretation so as to encompass all such modification and equivalent structures and functions.

This application claims the benefit of Japanese Patent Application No. 2024-083097 filed on May 22, 2024, which is hereby incorporated by reference herein its entirety.

What is claimed is:

1. An electrophotographic conductive roller comprising, in this order, a conductive substrate, an ion-conductive elastic layer, and a surface layer, the surface layer comprising a resin and carbon black;

the carbon black in the surface layer having an arithmetic mean Rc of circle-equivalent diameters of 60.0 nm or less and a σc/Rc of 0.000 to 0.650, where σc (nm) is a standard deviation of the circle-equivalent diameters; and the carbon black in the surface layer having an arithmetic mean d of inter-wall distances of 80.0 to 150.0 nm and a σd/d of 0.000 to 0.600, where σd (nm) is a standard deviation of the inter-wall distances.

2. The electrophotographic conductive roller according to claim 1, wherein the resin comprises a polyurethane having a polycarbonate structure.

3. The electrophotographic conductive roller according to claim 2, wherein the polyurethane satisfies at least one selected from the group consisting of the following (A), (B), and (C):

(A) having a structure represented by formula (1) below in a molecule;

(B) having one or both structures of a structure represented by formula (2) below and a structure represented by formula (3) below in a molecule; and (C) having a structure represented by formula (4) below in a molecule:

(1)

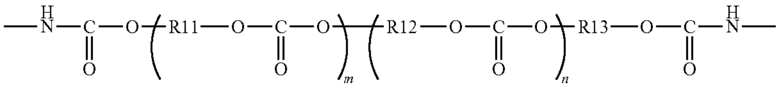

(2)

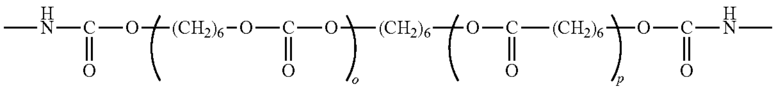

(3)

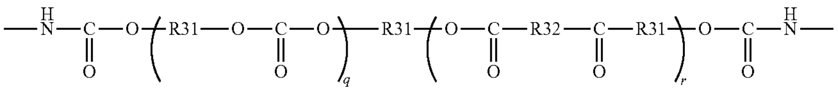

(4)

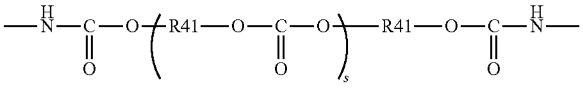

in formula (1),

R11, R12 and R13 each independently represent a divalent C3-9 hydrocarbon group;

R11 and R12 are hydrocarbon groups different from each other;

R13 is a hydrocarbon group identical to R11 or R12;

m and n are average numbers of moles added, each independently representing a number of 1.0 or greater;

in formula (2), o and p are average numbers of moles added, each independently representing a number of 1.0 or greater;

in formula (3),

R31 and R32 each independently represent a divalent C3-8 hydrocarbon group, and q and r are average numbers of moles added, each independently representing a number of 1.0 or greater; and in formula (4), R41 represents a divalent C6-9 hydrocarbon group, and s is an average number of moles added, representing a number of 1.0 or greater.

4. The electrophotographic conductive roller according to claim 1, wherein the surface layer further comprises at least one selected from the group consisting of a compound represented by formula (5) below, a compound represented by formula (6) below, and a compound represented by formula (7) below:

(5)

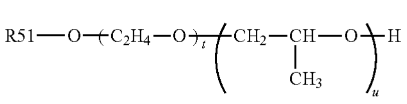

(6)

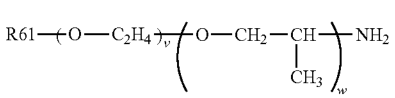

(7)

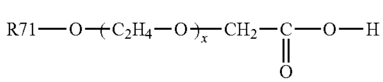

in formula (5), R51 represents a monovalent C1-12 hydrocarbon group, and t and u are average numbers of moles added, each independently representing a number of 1.0 or greater;

in formula (6), R61 represents a monovalent C1-8 hydrocarbon group, and v and w are average numbers of moles added, each independently representing a number of 1.0 or greater; and in formula (7), R71 represents a monovalent C1-12 hydrocarbon group, and x represents an average number of moles added, representing a number of 1.0 or greater.

5. The electrophotographic conductive roller according to claim 1, wherein when a corona discharger having a grid portion with 3.0 mm in width is placed under an environment at a temperature of 23° C. and a relative humidity of 50% such that a distance between the grid portion and an outer surface of the electrophotographic conductive roller be 1.0 mm and a direction of the width of the grid be aligned with an axial direction of the electrophotographic conductive roller, then a voltage of 8 kV is applied to the grid portion and the corona discharger is relatively moved along the axial direction of the electrophotographic conductive roller at a speed of 400 mm/sec to charge the outer surface of the electrophotographic conductive roller, and a potential of the outer surface at 0.06 seconds after passage of the grid is measured, a maximum value of the potential is less than 20.0 V.

6. A process cartridge configured to be attachable to and detachable from a main body of an electrophotographic image forming apparatus, comprising:

the electrophotographic conductive roller according to claim 1.

7. An electrophotographic image forming apparatus comprising a photoreceptor and a developing roller that supplies a developer to an electrostatic latent image formed on the photoreceptor, wherein the developing roller is the electrophotographic conductive roller according to claim 1.

* * * * *